United States Patent
Kumagai

(10) Patent No.: US 7,160,652 B2
(45) Date of Patent: Jan. 9, 2007

(54) HOLOGRAM ELEMENT

(75) Inventor: Munesato Kumagai, Shinjo-cho (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 10/716,811

(22) Filed: Nov. 18, 2003

(65) Prior Publication Data

US 2004/0100671 A1    May 27, 2004

(30) Foreign Application Priority Data

Nov. 18, 2002    (JP)    ............... 2002-333900

(51) Int. Cl.
*G01F 9/00*    (2006.01)
*G03H 1/04*    (2006.01)

(52) U.S. Cl. .............................. 430/5; 430/1
(58) Field of Classification Search ............... 430/5, 430/1; 359/15, 569
See application file for complete search history.

(56) References Cited

U.S. PATENT DOCUMENTS 6,866,969 B1 *    3/2005    Miyamae et al. ............... 430/5

FOREIGN PATENT DOCUMENTS

| JP | 10-10308 | 1/1998 |
|----|----------|--------|
| JP | 10-187014 | 7/1998 |
| JP | 10-254335 | 9/1998 |
| JP | 2000-121819 | 4/2000 |
| JP | 2002-258725 | 9/2002 |

\* cited by examiner

*Primary Examiner*—S. Rosasco
(74) *Attorney, Agent, or Firm*—Morrison & Foerster LLP

(57) ABSTRACT

Provided in a photomask for use in production of a hologram element having desired optical characteristics, a method for producing a hologram element, and a hologram element having desired optical characteristics. The first photomask is used for photolithography-based production of a hologram element having a hologram divided into two regions carrying a diffraction grating. The first photomask includes the first, second mask region having the non-light-transmitting mask portion and the light-transmitting portion, for forming the diffraction gratings of the regions of the hologram. The two mask regions differ in alignment-direction-wise arrangement interval for the light-transmitting portions and in ratio of the alignment-direction-wise width to the alignment-direction-wise arrangement interval for the light-transmitting portions.

6 Claims, 15 Drawing Sheets

FIG. 17A PRIOR ART  SUBSTRATE CLEANING PROCESS
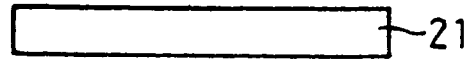
FIG. 17B PRIOR ART  RESIST COATING PROCESS
FIG. 17C PRIOR ART  EXPOSURE PROCESS
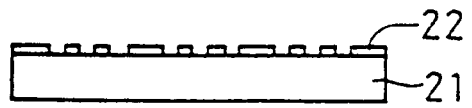
FIG. 17D PRIOR ART  ETCHING PROCESS
FIG. 17E PRIOR ART  ASHING PROCESS
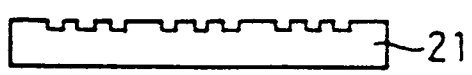
FIG. 17F PRIOR ART  SEPARATION PROCESS
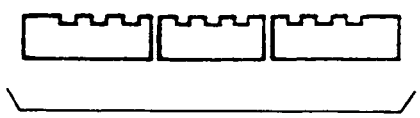

HOLOGRAM ELEMENT

BACKGROUND OF THE INVENTION

1. Field of the Invention

The present invention relates to a photomask used for production of a hologram element designed for use in an optical pickup device which is mounted in an optical disk recording/reproducing apparatus, a method for producing a hologram element using a photomask, and a hologram element.

2. Description of the Related Art

An optical disc such as compact disc (abbreviated as CD) or digital versatile disc (abbreviated as DVD) is capable of recording large volumes of information at high recording density, and thus finds a wider range of applications. For example, it is employed in an audiovisual system and a computer.

FIG. 15 is a perspective view showing an optical pickup apparatus 1 of conventional design. The optical pickup apparatus 1 is composed of a photodetector 2, a beam splitter 3, a collimator lens 4, an objective lens 5, and a light source 6. Light emitted from the light source 6 is reflected from the beam splitter 3, and is then converted through the collimator lens 4 into parallel light. Through the objective lens 5, the parallel light converges on an information recording surface of an optical disc 10. After being reflected from the information recording surface of the optical disc 10, the signal light carrying the information recorded on the optical disc 10 passes through the objective lens 5 and the collimator lens 4, and the beam splitter 3 so as to be incident on the photodetector 2.

In order to enhance the reproduction characteristics of the optical pickup apparatus which is mounted in an optical disc recording/reproducing apparatus for reading out information recorded on an optical disc, as much reproduction signal light as possible needs to be incident on the photodetector. The quality of the reproduction signal has hitherto been improved by employing a polarizing optical system. However, with recent improvements in the technology on disc drives and light detecting portions including light-receiving elements, it has become possible to obtain satisfactory reproduction characteristics even though signal light is not sufficiently intense. Besides, there has been an increasing demand for an apparatus both smaller in size and lower in cost. As a natural consequence of such a trend, an optical system of simpler structure has come into wider use instead of a polarizing optical system. As a representative example thereof, there has been known an integrated unit optical system that is constructed by combining a light source and a light detecting portion using a diffraction element.

FIG. 16 is a perspective view showing an optical pickup apparatus 11 employing an integrated unit optical system of another conventional design. The optical pickup apparatus 11 has a simple structure, which is roughly composed of an integrated unit 12 and an objective lens 13. In the optical pickup apparatus 11, the integrated unit 12 is arranged in such a way that the optical axis of the light emitted from the integrated unit 12 is aligned parallel to an information recording surface of an optical disc 10. Moreover, in the optical pickup apparatus 11, a collimator lens 14 is arranged in the area between the integrated unit 12 and the objective lens 13. Note that, in the optical pickup apparatus 11 employing such an integrated unit 12, a raising mirror may additionally be disposed in the area between the integrated unit 12 and the objective lens 13. The raising mirror serves to deflect the light emitted from the integrated unit 12 so as for the optical axis of the light converging on the information recording surface of the optical disc 10 to be perpendicular to the information recording surface.

The integrated unit 12 is composed of a hologram element 15, a laser element 17 acting as a light source, and a light-receiving element 18 acting as a light detecting portion. The hologram element 15 is provided with a hologram 16. The hologram 16 is divided into two regions, in each of which a diffraction grating is formed. Light emitted from the laser element 17 passes through the hologram 16 of the hologram element 15 and the collimator lens 14 in this order, and then converges on the information recording surface of the optical disc 10 through the objective lens 13. The light reflected from the optical disc 10 passes through the objective lens 13 and the collimator lens 14, and is then incident on the hologram 16 where the light is diffracted by the diffraction grating disposed in each of the hologram regions, whereby converted into first-order diffracted light. The first-order diffracted light is incident on a light detecting portion 18. The reflection light diffracted in one of the regions of the hologram 16 is used to detect pit data recorded on the optical disc 10, whereas the reflection light beam diffracted in the other region is used to detect pit data and a focus error signal.

Moreover, a tracking error signal is detected by exploiting the difference in intensity between the light beams diffracted in the respective regions of the hologram 16. In this case, if the diffraction gratings of the respective hologram regions are unequal in first-order diffraction efficiency (i.e. the ratio of the first-order diffracted light quantity to the whole light quantity), an offset is caused in the tracking error signal, and thus the optical pickup apparatus fails to achieve the following of the track on the optical disc by a light beam. As a result, the pit data cannot be detected properly. To overcome this problem, the hologram element has conventionally been so designed that the first-order diffraction efficiency ratio between the diffraction gratings of the respective hologram regions is kept in the range of 0.9 to 1.1. The first-order diffraction efficiency of the diffraction grating constituting the hologram is determined according to the groove depth of the diffraction grating and a duty ratio which is expressed as the ratio of the groove opening width to the grating interval. However, it is difficult to properly control the groove depth and groove opening width of the diffraction grating.

FIGS. 17A to 17F are sectional views showing the process steps for producing the hologram in accordance with a photolithography method. At first, in the substrate cleaning process shown in FIG. 17A, a surface of a glass substrate 21 is subjected to cleaning. Then, in the resist coating process shown in FIG. 17B, a resist 22, i.e. a photosensitive body, is applied to the surface of the glass substrate 21 in accordance with a spin-coat method, followed by a baking finish to volatilize the solvent.

In the exposure process shown in FIG. 17C, a photomask is brought into intimate contact, via the resist 22, with the glass substrate 21. The photomask has a fine diffraction-grating pattern for constituting the hologram. Then, ultraviolet rays are applied thereto to form the fine diffraction-grating pattern on the resist 22. Thereafter, in the etching process shown in FIG. 17D, the glass substrate 21 having the resist 22, on which the fine diffraction-grating pattern is formed through the exposure process, is subjected to dry etching using a reactive ion etching (RIE for short) device. Used as etching gas here is for example tetrafluoromethane (chemical formula: $CF_4$) gas or trifluoromethane (chemical formula: $CHF_3$) gas.

In the ashing process shown in FIG. 17E, the residual resist 22 remaining on the glass substrate 21 is removed by use of solvent, or by performing an ashing removal operation in an oxygen-gas atmosphere; wherefore concavities and convexities corresponding to the resist pattern are formed on the glass substrate 21. In the separation process shown in FIG. 17F, a plurality of holograms formed on the glass substrate 21 are separated to realize the final necessary configurations.

FIG. 18 is a flow chart showing the procedure for controlling a diffraction efficiency ratio as observed in the production of the hologram in accordance with the photolithography method. At Step u0, diffraction efficiency ratio control is started, and the procedure proceeds to Step u1. At Step u1, upon changing of the photomask, the photomask is brought into intimate contact with the glass plate. Then, the procedure proceeds to Step u2. At Step u2, the first-order diffraction efficiency of each hologram region is measured three times with varying exposure time. Then, the procedure proceeds to Step u3.

At Step u3, whether the first-order diffraction efficiency ratio is kept in the range of 0.9 to 1.1 or not is checked. The first-order diffraction efficiency is at its peak when the integral of the quantity of light reaches a certain value at which the diffraction grating has a duty ratio of 0.5. Thus, firstly determined is an optimum value for the light-quantity integral at which the measured first-order diffraction efficiency in each region is at the maximum. Then, a first-order diffraction efficiency ratio corresponding to the optimum light-quantity integral is obtained. The light-quantity integral is the product of the light quantity and the exposure-time duration. Whether the first-order diffraction efficiency ratio is kept in the range of 0.9 to 1.1 or not is checked, if not, the procedure returns to Step u2, where the exposure condition is changed once again. The operations in Steps u2 to u3 are repeated until the first-order diffraction efficiency ratio falls in the range of 0.9 to 1.1.

If, at Step u3, the first-order diffraction efficiency ratio is judged to fall in the range of 0.9 to 1.1, an optimum exposure condition is determined, and the procedure proceeds to Step u4. At Step u4, the hologram is produced in quantity in accordance with the determined exposure condition, and the procedure proceeds to Step u5. At Step u5, the procedure for controlling the diffraction efficiency ratio comes to an end. In this way, by performing optimum light exposure amount control whenever the photomask is changed, the first-order diffraction efficiency ratio between the two hologram regions can constantly be kept in the range of 0.9 to 1.1.

In addition to the above-described glass element, an element made of ultraviolet-ray-setting resin may also be used as the hologram element for use in such an optical system (refer to Patent Documents 1 and 2, for example). By using such an ultraviolet-ray-setting resin element, in contrast to the case of using a conventional glass element, not only it is possible to prepare the required material at lower cost, but it is also possible to adopt, as a manufacturing method, the so-called photopolymer method (2P method for short) which is excellent in productivity. This helps reduce the production cost of the hologram element.

FIGS. 19A to 19C are sectional views showing the process steps for producing the hologram in accordance with the photopolymer method. At first, as shown in FIG. 19A, a pair of stampers 23A and 23B and a resin substrate 24 are prepared. The stampers 23A and 23B are each constructed by forming a diffraction-grating pattern on a glass plate in accordance with the above-described photolithography method. The stamper 23A is arranged with its one surface carrying the diffraction-grating pattern facing with one surface of the resin substrate 24. The stamper 23B is arranged with its one surface carrying the diffraction-grating pattern facing with the other surface of the resin substrate 24. Then, ultraviolet-ray-setting resin 25 is applied to the one surface of the resin substrate 24. The ultraviolet-ray-setting resin 25 is also applied to that surface of the stamper 23B which carries the diffraction-grating pattern. As a resin material used to form the resin substrate 24, a transparent resin material is desirable that is resistant to degradation when irradiated with laser light. Specifically, acrylic resin is commonly used.

Subsequently, as shown in FIG. 19B, the stampers 23A and 23B are each brought into abutment with the resin substrate 24, followed by pressurizing as desired, so that the ultraviolet-ray-setting resin 25 is sufficiently spread across the surface of the resin substrate 24 under the pressure. Then, ultraviolet rays are applied thereto to cure the ultraviolet-ray-setting resin 25. After that, as shown in FIG. 19C, the stampers 23A and 23B are removed from the resin substrate 24 with the ultraviolet-ray-setting resin 25, thus forming a diffraction grating on the resin substrate 24.

The diffraction grating of the hologram element is realized in accordance with the conventional method thus far described. Here, the photomask in use is so designed that the respective hologram regions differ from each other in grating interval and curvature. This allows the signal light incident on the hologram to converge and enter the individual light-receiving regions formed on the light-receiving element 18 shown in FIG. 16. Moreover, the photomask is so designed that, when the grooves have the same depth, the hologram regions each have a duty ratio of 0.5 at which the highest first-order diffraction efficiency is obtained.

The related art is disclosed in Japanese Unexamined Patent Publications JP-A 10-187014 and JP-A 10-254335.

In general, the diffraction grating of the hologram is coated with a reflection preventive film to maximize the usability of laser light output. In this case, however, if the hologram element is produced using the above-described photomask designed such that the hologram regions each have a duty ratio of 0.5, the first-order diffraction efficiency ratio or, in the case of mass production, the mean value of the first-order diffraction efficiency ratio, may possibly be deviated from the optimum value: 1.0, if anything, fall outside the range from 0.9 to 1.1.

FIG. 20 is a graph showing the relationship between the first-order diffraction efficiency and light exposure amounts as observed in each of the two regions having different diffraction grating intervals. In FIG. 20, the solid line L10 represents the relationship between the first-order diffraction efficiency and light exposure amounts as observed in the first region having a grating interval of $\Delta$, whereas the long dashed double-dotted line L11 represents the relationship between the first-order diffraction efficiency and light exposure amounts as observed in the second region having a grating interval of $\delta$ which is shorter than the grating interval $\Delta$ of the first region.

According to the photolithography method, as seen from the solid line L10 and the long dashed double-dotted line L11, the larger the light exposure amount, the higher the first-order diffraction efficiency can be. The first-order diffraction efficiency is at the maximum when the light exposure amount reaches a certain level. After that, as the light exposure amount is increased, the first-order diffraction efficiency is decreased. Moreover, as seen from the solid line L10 and the long dashed double-dotted line L11, the variation of the first-order diffraction efficiency with respect to the variation of the light exposure amount is more remarkable in the second region having a shorter grating interval than in the first region having a longer grating interval. The first and second regions can be equal in first-order diffraction efficiency, that is, the first-order diffraction efficiency ratio between the first and second regions can be given as 1.0: the optimum value, only when the light exposure amount reaches a certain level where the duty ratio is given as 0.5, that is, the first and second regions each have the maximum first-order diffraction efficiency. When the light exposure amount is at a level other than the aforementioned level, the region having a shorter grating interval has lower first-order diffraction efficiency.

FIG. 21 is a graph showing the relationship between the first-order diffraction efficiency and light exposure amounts found before and after a reflection preventive film is vapor-deposited, as observed in each of the two regions having different diffraction grating intervals. In FIG. 21, the dotted line L12 represents the relationship between the first-order diffraction efficiency and light exposure amounts found before vapor-deposition of a reflection preventive film, as observed in the first region having a grating interval of Δ; the solid line L13 represents the relationship between the first-order diffraction efficiency and light exposure amounts found after vapor-deposition of a reflection preventive film, as observed in the first region; the long dashed dotted line L14 represents the relationship between the first-order diffraction efficiency and light exposure amounts found before vapor-deposition of a reflection preventive film, as observed in the second region having the grating interval of δ which is shorter than the grating interval Δ of the first region; and the long dashed double-dotted line L15 represents the relationship between the first-order diffraction efficiency and light exposure amounts found after vapor-deposition of a reflection preventive film, as observed in the second region.

In general, a reflection preventive film is formed on the diffraction grating by stacking dielectric films in layers, in accordance with the vapor-deposition method. However, such a vapor-depositing process adversely affects the ideal steric structure of the diffraction grating fabricated by means of photolithography, resulting in a decrease in the first-order diffraction efficiency of the first and second regions. Specifically, as shown in FIG. 21, in the first region, the first-order diffraction efficiency changes from a state as indicated by the dotted line L12 to a state as indicated by the solid line L13, whereas in the second region, the first-order diffraction efficiency changes from a state as indicated by the long dashed dotted line L14 to a state as indicated by the long dashed double-dotted line L15. As seen from FIG. 21, the second region having a shorter grating interval undergoes a sharper decrease in the first-order diffraction efficiency. As a result, there occurs a disparity in first-order diffraction efficiency between the two regions, and thus the first-order diffraction efficiency ratio is greatly deviated from the optimum value: 1.0.

In a hologram element designed for use in an optical media reproducing apparatus for reading and writing an optical medium requiring writing of information, such as a CD Recordable (abbreviated as CD-R), the first-order diffraction efficiency is low, and variation in the first-order diffraction efficiency has a profound influence on the reading and writing on the optical medium.

SUMMARY OF THE INVENTION

Hence, an object of the invention is to provide a photomask for use in production of a hologram element having desired optical characteristics, a method for producing a hologram element, and a hologram element having desired optical characteristics.

The invention provides a photomask for use in photolithography-based production of a hologram element having a hologram which is divided into a plurality of regions in each of which a diffraction grating is formed, the photomask comprising:

a plurality of mask regions for forming the diffraction gratings of the respective regions of the hologram, the mask regions being composed of a non-light-transmitting mask portion and a light-transmitting portion, wherein, of the plurality of mask regions, at least two mask regions are configured differently from each other in arrangement interval at which the light-transmitting portions are arranged in an alignment direction, and in ratio of an alignment-direction-wise width for the light-transmitting portions to the alignment-direction-wise arrangement interval for the light-transmitting portions.

According to the invention, the photomask includes a plurality of mask regions for forming the diffraction gratings of the respective regions of the hologram. The mask regions are composed of a non-light-transmitting mask portion and a light-transmitting portion. Of the plurality of mask regions, at least two mask regions are configured differently from each other in alignment-direction-wise arrangement interval for the light-transmitting portions and in ratio of the alignment-direction-wise width to the alignment-direction-wise arrangement interval for the light-transmitting portions. In a hologram element produced through photolithography-based exposure process with use of the photomask, its hologram is so configured that, of a plurality of hologram regions, at least two regions have different diffraction grating intervals and different duty ratios. The duty ratio refers to a ratio of an alignment-direction-wise groove opening width to a grating interval in the diffraction grating.

In the hologram element thus constructed, of a plurality of hologram regions, at least two regions have different diffraction grating intervals. Hence, a difference can be made between the regions in relationship between light exposure amounts in the formation of the diffraction gratings of the regions and the first-order diffraction efficiency. Even if, in the hologram element, the hologram regions have different diffraction grating intervals, as long as the diffraction gratings of the regions have equal duty ratio, a certain exposure-amount value at which the regions are equal in first-order diffraction efficiency generally signifies a certain exposure-amount value at which the regions each have the maximum first-order diffraction efficiency. At this time, the regions are also equal in maximum value for the first-order diffraction efficiency. Thus, by designing the hologram element such that the diffraction gratings of the hologram regions have different duty ratios, a difference can be made between the regions in exposure-amount value corresponding to the maximum first-order diffraction efficiency. Thereby, the first-order diffraction efficiency ratio between the regions can be set at a desired value, and thus a hologram element exhibiting desired optical characteristics can be produced.

In the invention, it is preferable that the ratio of the alignment-direction-wise width to the alignment-direction-wise arrangement interval for the light-transmitting portions in a mask region having a shorter light-transmitting-portion arrangement interval is made smaller than the ratio of the alignment-direction-wise width to the alignment-direction-wise arrangement interval for the light-transmitting portions in a mask region having a longer light-transmitting-portion arrangement interval.

According to the invention, the photomask includes a plurality of mask regions for forming the diffraction gratings of the respective regions of the hologram. The mask regions are composed of a non-light-transmitting mask portion and a light-transmitting portion. Of a plurality of mask regions, at least two mask regions are configured differently from each other in alignment-direction-wise arrangement interval for the light-transmitting portions. Moreover, the mask region having a shorter light-transmitting-portion arrangement interval is made smaller in ratio of the alignment-direction-wise width to the alignment-direction-wise arrangement interval for the light-transmitting portions than the mask region having a longer light-transmitting-portion arrangement interval. In a hologram element produced through photolithography-based exposure process with use of the photomask, its hologram is so configured that, of a plurality of hologram regions, at least two regions have different diffraction grating intervals. Moreover, in terms of a duty ratio, which refers to the ratio of the alignment-direction-wise groove opening width to the grating interval in the diffraction grating, the diffraction grating having a shorter grating interval is made smaller in duty ratio than the diffraction grating having a longer grating interval. In the hologram element thus constructed, of a plurality of hologram regions, at least two regions have different diffraction grating intervals. Hence, a difference can be made between the regions in relationship between light exposure amounts in the formation of the diffraction gratings of the regions and the first-order diffraction efficiency.

Even if, in the hologram element, the hologram regions have different diffraction grating intervals, as long as the diffraction gratings of the regions have equal duty ratio, a certain exposure-amount value at which the regions are equal in first-order diffraction efficiency generally signifies a certain exposure-amount value at which the regions each have the maximum first-order diffraction efficiency. Moreover, it has been known that, the smaller the duty ratio of the diffraction grating in the hologram, the larger the exposure-amount value corresponding to the maximum first-order diffraction efficiency. Further, a graph showing the relationship between light exposure amounts in the production of the diffraction grating of each hologram region and the first-order diffraction efficiency commonly takes on a convex form wherein the first-order diffraction efficiency is at the maximum when the light exposure amount reaches a certain level. In the graph, the greater the grating interval, the gentler the curve can be with respect to the vertex indicating the exposure amount corresponding to the maximum first-order diffraction efficiency. Thus, in the hologram element, by adjusting the duty ratio of the diffraction grating having a shorter grating interval to be smaller than that of the diffraction grating having a longer grating interval, it is possible to make the exposure amount corresponding to the maximum first-order diffraction efficiency larger in the region having a diffraction grating with a shorter grating interval than in the region having a diffraction grating with a longer grating interval. Moreover, a desired value can be assigned to the exposure amount with which the hologram regions are equal in first-order diffraction efficiency. In this way, a desired value can be assigned to the exposure amount with which the hologram regions are equal in first-order diffraction efficiency, in other words, the first-order diffraction efficiency ratio between the regions is given as 1.0. Therefore, during the photolithography-based exposure process, the photoresist can be prevented from undergoing insufficient light exposure caused by the exposure amount being smaller than the desired value. Further, a hologram element exhibiting desired optical characteristics can be realized without fail.

In the invention, it is preferable that in each of the regions, the ratio of the alignment-direction-wise width to the alignment-direction-wise arrangement interval for the light-transmitting portions is set at 0.5 or below.

According to the invention, the photomask includes a plurality of mask regions for forming the diffraction gratings of the respective regions of the hologram. The mask regions are composed of a non-light-transmitting mask portion and a light-transmitting portion. Of a plurality of mask regions, at least two mask regions are configured differently from each other in alignment-direction-wise arrangement interval for the light-transmitting portions. Moreover, in each of the regions, the ratio of the alignment-direction-wise width to the alignment-direction-wise arrangement interval for the light-transmitting portions is set at 0.5 or below. In a hologram element produced through photolithography-based exposure process with use of the photomask, its hologram is so configured that, of a plurality of hologram regions, at least two regions have different diffraction grating intervals, and that a duty ratio, which refers to the ratio of the alignment-direction-wise groove opening width to the grating interval in the diffraction grating, is set at 0.5 or below. In the hologram element thus constructed, of a plurality of hologram regions, at least two regions have different diffraction grating intervals. Hence, a difference can be made between the regions in relationship between light exposure amounts in the formation of the diffraction gratings of the regions and the first-order diffraction efficiency.

Even if, in the hologram element, the hologram regions have different diffraction grating intervals, as long as the diffraction gratings of the regions have equal duty ratio, a certain exposure-amount value at which the regions are equal in first-order diffraction efficiency generally signifies a certain exposure-amount value at which the regions each have the maximum first-order diffraction efficiency. Moreover, it has been known that, the smaller the duty ratio of the diffraction grating in the hologram, the larger the exposure-amount value corresponding to the maximum first-order diffraction efficiency. Further, a graph showing the relationship between light exposure amounts in the production of the diffraction grating of each hologram region and the first-order diffraction efficiency commonly takes on a convex form wherein the first-order diffraction efficiency is at the maximum when the light exposure amount reaches a certain level. In the graph, the greater the grating interval, the gentler the curve can be with respect to the vertex indicating the exposure amount corresponding to the maximum first-order diffraction efficiency. Thus, in the hologram element, by adjusting the duty ratio of the hologram to be 0.5 or below, a desired value can be assigned to the exposure amount with which the hologram regions are equal in first-order diffraction efficiency. In this way, a desired value can be assigned to the exposure amount with which the hologram regions are equal in first-order diffraction efficiency, in other words, the first-order diffraction efficiency ratio between the regions is given as 1.0. Therefore, during the photolithography-based exposure process, the photoresist can be prevented from undergoing insufficient light exposure caused by the exposure amount being smaller than the desired value. Further, a hologram element exhibiting desired optical characteristics can be realized without fail.

The invention provides a method for producing a hologram-element, comprising performing light exposure by a photolithography method in which the photomask mentioned above is used, with a light-exposure amount kept in a level where respective hologram regions having diffraction gratings are equal in first-order diffraction efficiency.

According to the invention, a hologram element is produced by performing light exposure, with the light-exposure amount kept in a level where the respective hologram regions having diffraction gratings are equal in first-order diffraction efficiency. Thus, the first-order diffraction efficiency ratio between the hologram regions is given as 1.0. This makes it possible to produce a hologram element exhibiting optimum optical characteristics.

The invention provides a method for producing a hologram-element, comprising performing light exposure by a photolithography method in which the photomask mentioned above is used, with a light-exposure amount kept in a level where a hologram region having a diffraction grating with a shorter grating interval is made larger in first-order diffraction efficiency than a hologram region having a diffraction grating with a longer grating interval.

According to the invention, a hologram element is produced by performing light exposure, with the light-exposure amount kept in a level where the hologram region having a diffraction grating with a shorter grating interval is made larger in first-order diffraction efficiency than the hologram region having a diffraction grating with a longer grating interval. In cases where a reflection preventive film is applied to the hologram element, in general, the degree of decrease in the first-order diffraction efficiency is higher in the hologram region having a shorter grating interval than in the hologram region having a longer grating interval. This makes it difficult to make the regions equal in first-order diffraction efficiency, in other words, it is difficult to set the first-order diffraction efficiency ratio between the regions at 1.0. With this in view, the hologram element is designed in advance such that the first-order diffraction efficiency of the region having a diffraction grating with a shorter grating interval is made greater than that of the region having a diffraction grating with a longer grating interval. By so doing, even if a reflection preventive film is applied to the hologram element, the regions can be made equal in first-order diffraction efficiency, in other words, the first-order diffraction efficiency ratio between the regions can be set at 1.0: the optimum value. As a result, a hologram element exhibiting optimum optical characteristics can be produced without fail.

The invention provides a hologram element comprising:
a hologram which is divided into a plurality of regions in each of which a diffraction grating is formed,
wherein, of the regions, at least two regions have different diffraction grating intervals and different duty ratios, the duty ratio referring to a ratio of an alignment-direction-wise groove opening width to the grating interval in the diffraction grating.

According to the invention, the hologram element includes the hologram divided into a plurality of regions in each of which a diffraction grating is formed. Of the regions, at least two regions have different diffraction grating intervals and different duty ratios. The duty ratio refers to the ratio of the alignment-direction-wise groove opening width to the grating interval in the diffraction grating. In the hologram element thus constructed, since at least two hologram regions have different diffraction grating intervals, a difference is caused between the regions in relationship between light exposure amounts in the formation of the diffraction gratings of the regions and the first-order diffraction efficiency.

Even if, in the hologram element, the hologram regions have different diffraction grating intervals, as long as the diffraction gratings of the regions have equal duty ratio, a certain exposure-amount value at which the regions are equal in first-order diffraction efficiency generally signifies a certain exposure-amount value at which the regions each have the maximum first-order diffraction efficiency. At this time, the regions are also equal in maximum value for the first-order diffraction efficiency. Thus, by designing the hologram element such that the diffraction gratings of the hologram regions have different duty ratios, a difference can be made between the regions in exposure-amount value corresponding to the maximum first-order diffraction efficiency. Thereby, the first-order diffraction efficiency ratio between the regions can be set at a desired value, and thus the hologram element succeeds in providing desired optical characteristics.

In the invention, it is preferable that a duty ratio of the diffraction grating having the maximum grating interval is set at 0.5 or below, whereas a duty ratio of the diffraction grating having the minimum grating interval is set at 0.5 or above, the duty ratio referring to a ratio of an alignment-direction-wise groove opening width to the grating interval in the diffraction grating.

According to the invention, the hologram element includes the hologram divided into a plurality of regions in each of which a diffraction grating is formed. Of the regions, at least two regions have different diffraction grating intervals. Moreover, the duty ratio of the diffraction grating having the maximum grating interval is set at 0.5 or below, whereas the duty ratio of the diffraction grating having the minimum grating interval is set at 0.5 or above. The duty ratio refers to the ratio of the alignment-direction-wise groove opening width to the grating interval in the diffraction grating. In the hologram element thus constructed, since at least two hologram regions have different diffraction grating intervals, a difference is caused between the regions in relationship between light exposure amounts in the formation of the diffraction gratings of the regions and the first-order diffraction efficiency.

Even if, in the hologram element, the hologram regions have different diffraction grating intervals, as long as the diffraction gratings of the regions have equal duty ratio, a certain exposure-amount value at which the regions are equal in first-order diffraction efficiency generally signifies a certain exposure-amount value at which the regions each have the maximum first-order diffraction efficiency. Moreover, it has been known that, the smaller the duty ratio of the diffraction grating in the hologram, the larger the exposure-amount value corresponding to the maximum first-order diffraction efficiency. Further, a graph showing the relationship between light exposure amounts in the production of the diffraction grating of each hologram region and the first-order diffraction efficiency commonly takes on a convex form wherein the first-order diffraction efficiency is at the maximum when the light exposure amount reaches a certain level. In the graph, the greater the grating interval, the gentler the curve can be with respect to the vertex indicating the exposure amount corresponding to the maximum first-order diffraction efficiency. Thus, by designing the hologram element such that the duty ratio, which refers to the ratio of the alignment-direction-wise groove opening width to the grating interval in the diffraction grating, of the diffraction grating having the maximum grating interval is set at 0.5 or below, whereas the duty ratio of the diffraction grating having the minimum grating interval is set at 0.5 or above, a desired value can be assigned to the exposure amount with which the hologram regions are equal in first-order diffraction efficiency. In this way, since a desired value can be assigned to the exposure amount with which the hologram regions are equal in first-order diffraction efficiency, in other words, the first-order diffraction efficiency ratio between the regions is given as 1.0, the hologram element succeeds in providing desired optical characteristics.

The invention provides a hologram element comprising:
a hologram which is divided into a plurality of regions in each of which a diffraction grating is formed,
wherein, of the regions, at least two regions differ in diffraction grating interval, but are equal in first-order diffraction efficiency.

According to the invention, the hologram element includes the hologram divided into a plurality of regions in each of which a diffraction grating is formed. Of the regions, at least two regions differ in diffraction grating interval, but are equal in first-order diffraction efficiency. In the hologram element thus constructed, since at least two hologram regions have different diffraction grating intervals, a difference is caused between the regions in relationship between light exposure amounts in the formation of the diffraction gratings of the regions and the first-order diffraction efficiency. Moreover, since the regions are equal in first-order diffraction efficiency, the first-order diffraction efficiency ratio between the regions is given as 1.0. Thus, the hologram element succeeds in providing optimum optical characteristics.

The invention provides a hologram element comprising:
a hologram which is divided into a plurality of regions in each of which a diffraction grating is formed,
wherein, of the regions, at least two regions have different diffraction grating intervals,
and wherein the regions of the hologram are equal to each other in first-order diffraction efficiency in a state of being coated with a reflection preventive film.

According to the invention, the hologram element includes the hologram divided into a plurality of regions in each of which a diffraction grating is formed. Of the regions, at least two regions have different diffraction grating intervals, and the regions are equal in first-order diffraction efficiency in the state of being coated with a reflection preventive film. In the hologram element thus constructed, since at least two hologram regions have different diffraction grating intervals, a difference is caused between the regions in relationship between light exposure amounts in the formation of the diffraction gratings of the regions and the first-order diffraction efficiency. Moreover, since the regions are equal in first-order diffraction efficiency in the state of being coated with a reflection preventive film, the first-order diffraction efficiency ratio between the hologram regions is given as 1.0. Thus, the hologram element succeeds in providing optimum optical characteristics even in the state in which the hologram regions are coated with a reflection preventive film.

BRIEF DESCRIPTION OF THE DRAWINGS

Other and further objects, features, and advantages of the invention will be more explicit from the following detailed description taken with reference to the drawings wherein:

FIGS. 17A to 17F are sectional views showing the process steps for producing the hologram in accordance with a photolithography method;

DETAILED DESCRIPTION OF THE PREFERRED EMBODIMENTS

Figure 1:
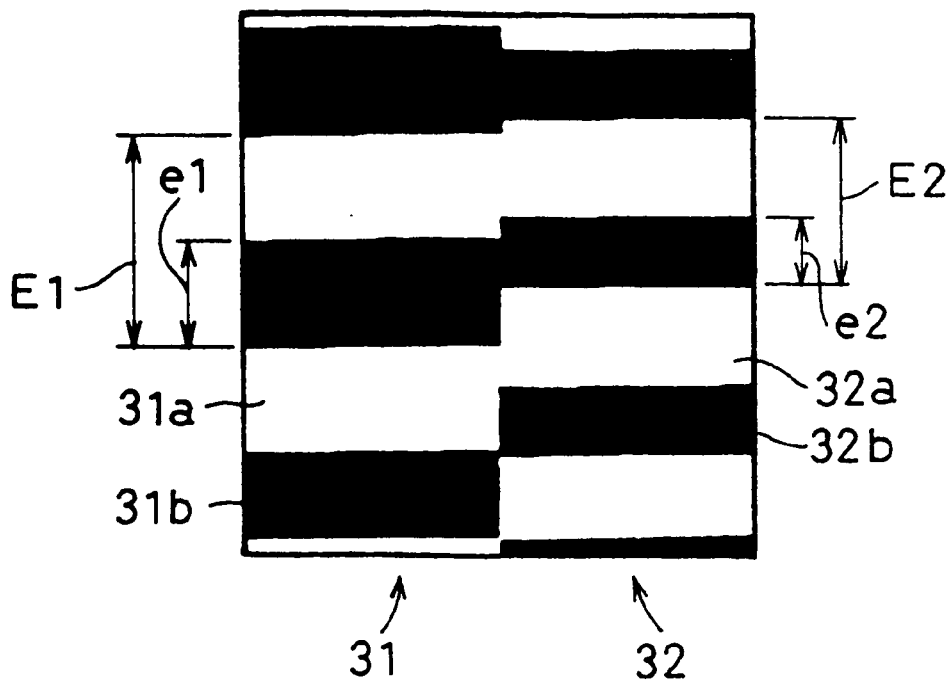
FIG. 1 is a plan view of a first photomask according to one embodiment of the invention, illustrating a first mask region and a second mask region in an enlarged state.

Now referring to the drawings, preferred embodiments of the invention are described below.

Figure 2:
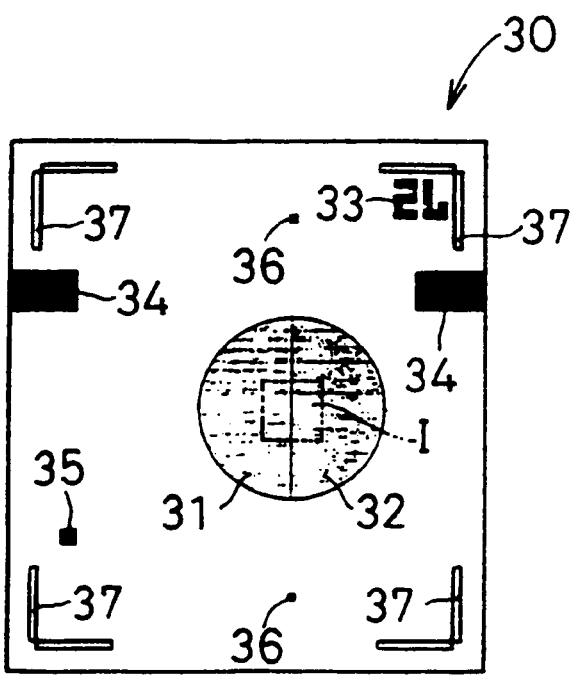
FIG. 2 is a plan view showing the first photomask as a whole.

FIG. 1 is a plan view of a first photomask 30 according to one embodiment of the invention, illustrating a first mask region 31 and a second mask region 32 in an enlarged state. FIG. 2 is a plan view showing the first photomask 30 as a whole. FIG. 1 is an enlarged view showing Section I in the vicinity of the boundary between the first and second mask regions 31 and 32 shown in FIG. 2. The first photomask 30 is designed for use in the photolithography-based production of an a-model hologram element having a hologram which is divided into a plurality of regions, in this embodiment, two regions: a first region and a second region, in each of which a diffraction grating is formed.

The first photomask 30 includes a plurality of mask regions, in this embodiment, two mask regions: the first mask region 31 and the second mask region 32, for forming the diffraction gratings of the first and second regions of the hologram constituting the a-model hologram element. The first mask region 31 is composed of a non-light-transmitting mask portion 31a and a light-transmitting portion 31b. The second mask region 32 is composed of a non-light-transmitting mask portion 32a and a light-transmitting portion 32b. More specifically, the light-transmitting portion 31b, 32b of the first, second mask region 31, 32 is shaped as an opening portion penetrating through the first photomask 30 in the thicknesswise direction. In the first photomask 30, the regions other than the light-transmitting portion 31b, 32b of the first, second mask region 31, 32 possess non-translucency.

As shown in FIG. 1, the first and second mask regions 31 and 32 are configured differently from each other in some ways. Firstly, the interval at which the light-transmitting portions 31b of the first mask region 31 are arranged in the alignment direction (i.e. the alignment-direction-wise arrangement interval E1) is made different from the interval at which the light-transmitting portions 32b of the second mask region 32 are arranged in the alignment direction (i.e. the alignment-direction-wise arrangement interval E2). Secondly, the ratio of the alignment-direction-wise width e1 to the alignment-direction-wise arrangement interval E1, for the light-transmitting portions 31b of the first mask region 31 (i.e. e1/E1) is made different from the ratio of the alignment-direction-wise width e2 to the alignment-direction-wise arrangement interval E2, for the light-transmitting portions 32b in the second mask region 32 (i.e. e2/E2).

Specifically, the arrangement interval E2 set for the light-transmitting portions 32b of the second mask region 32 is made shorter than the arrangement interval E1 set for the light-transmitting portions 31b of the first mask region 31. Moreover, the ratio of the alignment-direction-wise width e2 to the alignment-direction-wise arrangement interval E2, for the light-transmitting portions 32b of the second mask region 32 (e2/E2) is made smaller than the ratio of the alignment-direction-wise width e1 to the alignment-direction-wise arrangement interval E1, for the light-transmitting portions 31b of the first mask region 31 (e1/E1). More specifically, in the first mask region 31, the ratio of the alignment-direction-wise width e1 to the alignment-direction-wise arrangement interval E1 for the light-transmitting portions 31b (e1/E1) is set at 0.5 or below, in this embodiment, set at 0.5. On the other hand, in the second mask region 32, the ratio of the alignment-direction-wise width e2 to the alignment-direction-wise arrangement interval E2 for the light-transmitting portions 32b (e2/E2) is set at 0.5 or below, in this embodiment, set at 0.4.

As shown in FIG. 2, the first and second mask regions 31 and 32 are each semicircular-shaped, and their radius of curvatures are identical in dimension. In the first and second mask regions 31 and 32, their arcs are continuous with each other at the opposite ends, whereas their chords make contact with each other. In this way, the first and second mask regions 31 and 32 are joined to each other to form a circular region. The first and second mask regions 31 and 32 are arranged at substantially the central position of the first photomask 30. The first photomask 30 includes an identification mark 33, a first test pattern 34, a second test pattern 35, an image processing mark 36, and a dicing mark 37.

Figure 3:
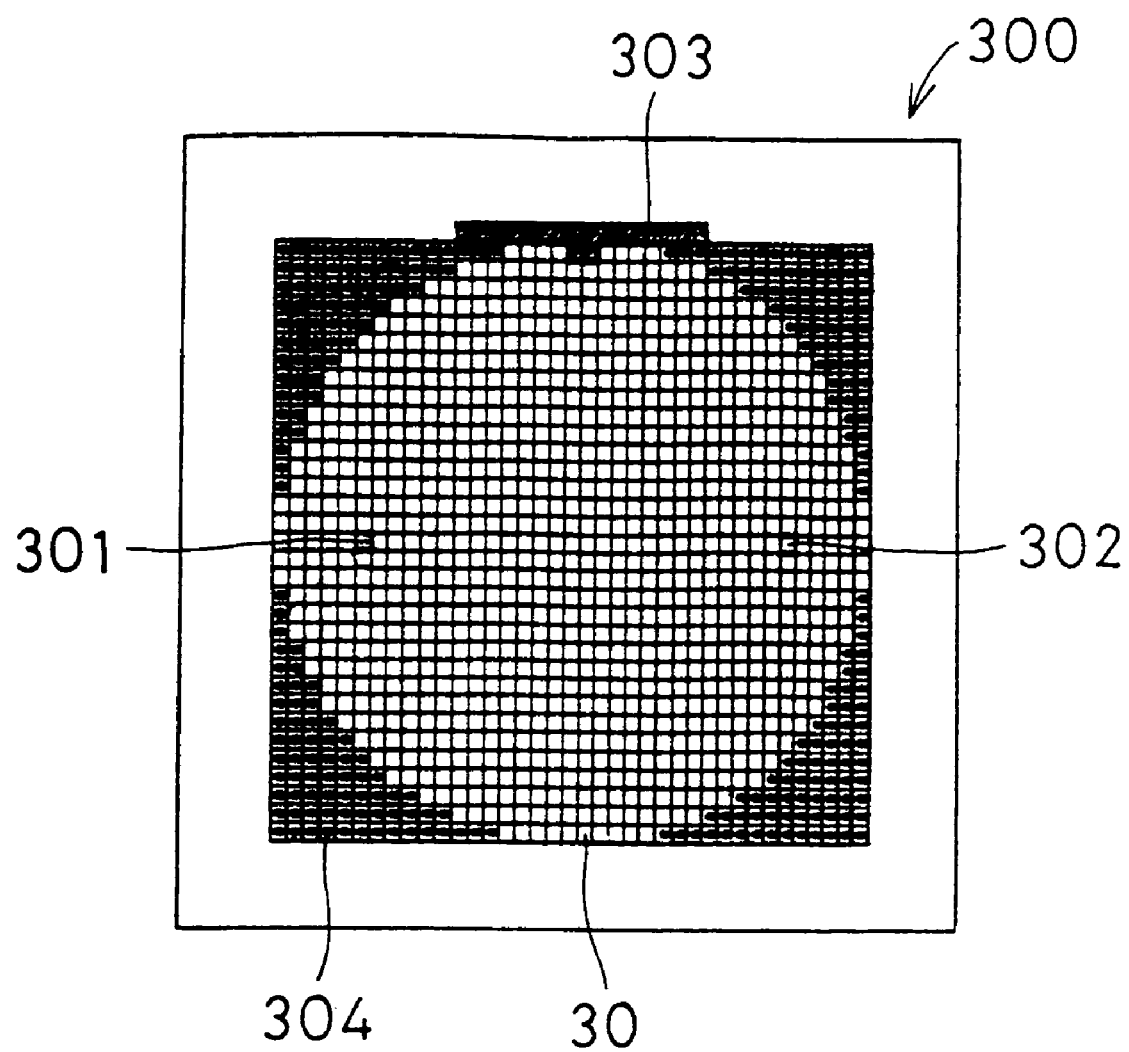
FIG. 3 is a plan view showing a first photomask cluster.

The identification mark 33, which is for example indicated by a letter such as a numeric character, is used to identify models of hologram elements produced with use of the first photomask 30. The first test pattern 34 is composed of straight-line segments arranged side by side at an interval equal to a median value of the grating interval of the hologram. When a defective hologram component is produced, the first test pattern 34 is used to analyze the cause. The second test pattern 35, which is composed of straight-line segments arranged side by side at an interval equal to a median value of the grating interval of the hologram, is used for examinations conducted in the production of the photomask. When a hologram element in finished form is secured to a package, the image processing mark 36 is used to adjust the orientation of the hologram element. Moreover, an assembly body of hologram elements, which is produced with use of a cluster of photomasks as shown in FIG. 3 (described later), is subjected to dicing to obtain separate hologram elements. At this time, the dicing operation is performed with reference to the dicing mark 37.

FIG. 3 is a plan view showing a first photomask cluster 300. The first photomask cluster 300 is composed of a plurality of first photomasks 30 and a plurality of non-light-transmitting, pattern-absent masks 304 in which no mask pattern is formed. The first photomask cluster 300 further includes a first alignment pattern 301, a second alignment pattern 302, and a direction-identifying mark 303.

The first and second alignment patterns 301 and 302 are used to perform alignment at the time of light exposure. The direction-identifying mark 303, which is analogous to the pattern-absent mask 304, is used to perform orientation adjustment during the alignment. Since the lens disposed in the exposure device is circular-shaped, light emitted from the exposure device exhibits circular intensity distribution. The first photomasks 30 are accordingly arranged substantially circularly.

Figure 4:
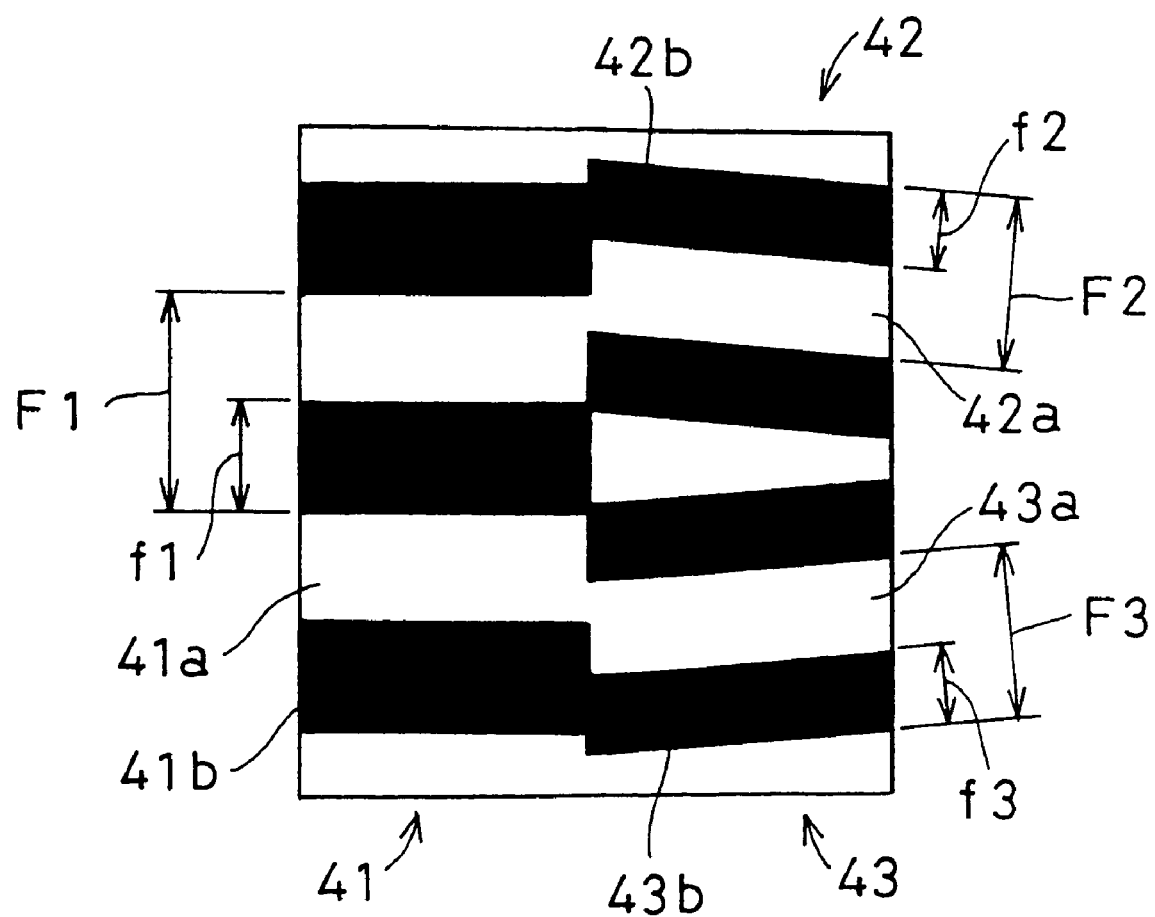
FIG. 4 is a plan view of a second photomask according to another embodiment of the invention, illustrating a first mask region, a second mask region, and a third mask region in an enlarged state.
Figure 5:
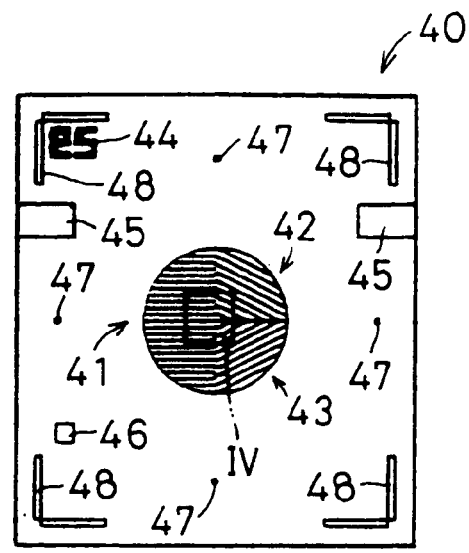
FIG. 5 is a plan view showing the second photomask as a whole.

FIG. 4 is a plan view of a second photomask 40 according to another embodiment of the invention, illustrating a first mask region 41, a second mask region 42, and a third mask region 43 in an enlarged state. FIG. 5 is a plan view showing the second photomask 40 as a whole. FIG. 4 is an enlarged view showing Section IV in the vicinity of the boundary among the first, second, and third mask regions 41, 42, and 43 shown in FIG. 5. The second photomask 40 is designed for use in the photolithography-based production of a b-model hologram element having a hologram which is divided into a plurality of regions, in this embodiment, three regions: a first, a second, and a third region, in each of which a diffraction grating is formed.

The second photomask 40 includes a plurality of mask regions, in this embodiment, three mask regions: the first mask region 41, the second mask region 42, and the third mask region 43 for forming the diffraction gratings of the first, second, and third regions of the hologram constituting the b-model hologram element. The first mask region 41 is composed of a non-light-transmitting mask portion 41a and a light-transmitting portion 41b. The second mask region 42 is composed of a non-light-transmitting mask portion 42a and a light-transmitting portion 42b. The third mask region 43 is composed of a non-light-transmitting mask portion 43a and a light-transmitting portion 43b. More specifically, the light-transmitting portion 41b, 42b, 43b of the first, second, third mask region 41, 42, 43 is shaped as an opening portion penetrating through the second photomask 40 in the thicknesswise direction. In the second photomask 40, the regions other than the light-transmitting portion 41b, 42b, 43b of the first, second, third mask region 41, 42, 43 possess non-translucency.

As shown in FIG. 4, the first and second mask regions 41 and 42 are configured differently from each other in some ways. Firstly, the interval at which the light-transmitting portions 41b of the first mask region 41 are arranged in the alignment direction (i.e. the alignment-direction-wise arrangement interval F1) is made different from the interval at which the light-transmitting portions 42b of the second mask region 42 are arranged in the alignment direction (i.e. the alignment-direction-wise arrangement interval F2). Secondly, the ratio of the alignment-direction-wise width f1 to the alignment-direction-wise arrangement interval F1, for the light-transmitting portions 41b of the first mask region 41 (i.e. f1/F1) is made different from the ratio of the alignment-direction-wise width f2 to the alignment-direction-wise arrangement interval F2, for the light-transmitting portions 42b of the second mask region 42 (i.e. f2/F2). Moreover, the first and third mask regions 41 and 43 are also configured differently from each other in some ways. Firstly, the interval at which the light-transmitting portions 41b of the first mask region 41 are arranged in the alignment direction (i.e. the alignment-direction-wise arrangement interval F1) is made different from the interval at which the light-transmitting portions 43b of the third mask region 43 are arranged in the alignment direction (i.e. the alignment-direction-wise arrangement interval F3). Secondly, the ratio of the alignment-direction-wise width f1 to the alignment-direction-wise arrangement interval F1, for the light-transmitting portions 41b of the first mask region 41 (i.e. f1/F1) is made different from the ratio of the alignment-direction-wise width f3 to the alignment-direction-wise arrangement interval F3, for the light-transmitting portions 43b in the third mask region 43 (i.e. f3/F3).

Specifically, the arrangement interval F2 set for the light-transmitting portions 42b of the second mask region 42 is made shorter than the arrangement interval F1 set for the light-transmitting portions 41b of the first mask region 41. Moreover, the ratio of the alignment-direction-wise width f2 to the alignment-direction-wise arrangement interval F2 for the light-transmitting portions 42b of the second mask region 42 (f2/F2) is made smaller than the ratio of the alignment-direction-wise width f1 to the alignment-direction-wise arrangement interval F1 for the light-transmitting portions 41b of the first mask region 41 (f1/F1). More specifically, in the first mask region 41, the ratio of the alignment-direction-wise width f1 to the alignment-direction-wise arrangement interval F1 for the light-transmitting portions 41b (f1/F1) is set at 0.5 or below, in this embodiment, set at 0.5. On the other hand, in the second mask region 42, the ratio of the alignment-direction-wise width f2 to the alignment-direction-wise arrangement interval F2 for the light-transmitting portions 42b (f2/F2) is set at 0.5 or below, in this embodiment, set at 0.45.

In addition, specifically, the arrangement interval F3 set for the light-transmitting portions 43b of the third mask region 43 is made shorter than the arrangement interval F1 set for the light-transmitting portions 41b of the first mask region 41. Moreover, the ratio of the alignment-direction-wise width f3 to the alignment-direction-wise arrangement interval F3 for the light-transmitting portions 43b of the third mask region 43 (f3/F3) is made smaller than the ratio of the alignment-direction-wise width f1 to the alignment-direction-wise arrangement interval F1 for the light-transmitting portions 41b of the first mask region 41 (f1/F1). More specifically, in the first mask region 41, the ratio of the alignment-direction-wise width f1 to the alignment-direction-wise arrangement interval F1 for the light-transmitting portions 41b (f1/F1) is set at 0.5 or below, in this embodiment, set at 0.5. On the other hand, in the third mask region 43, the ratio of the alignment-direction-wise width f3 to the alignment-direction-wise arrangement interval F3 for the light-transmitting portions 43b (f3/F3) is set at 0.5 or below, in this embodiment, set at 0.45.

As shown in FIG. 5, the first mask region 41 is semicircular-shaped. The second and third mask regions 42 and 43 are each sector-shaped, and their radius of curvatures are each identical in dimension with that of the first mask region 41. Specifically, the second and third mask regions 42 and 43 each have the shape of a sector wherein the angle formed between a line connecting one end of the arc with the center of curvature and a line connecting the other end of the arc with the center of curvature is 90°. In the second and third mask regions 42 and 43, their arcs are continuous with each other at one ends, and their one line segments, each connecting one end of the arc with the center of curvature, make contact with each other. In this way, the second and third mask regions 42 and 43 are joined to each other to form a semicircular region. Further, in the first, second, and third mask regions 41, 42, and 43, their arcs are continuous with one another, whereas their chords make contact with one another. In this way, the first, second, and third mask regions 41, 42, and 43 are joined to each other to form a circular region. The first, second, and third mask regions 41, 42, and 43 are arranged at substantially the central position of the second photomask 40. The second photomask 40 includes an identification mark 44, a first test pattern 45, a second test pattern 46, an image processing mark 47, and a dicing mark 48.

Figure 6:
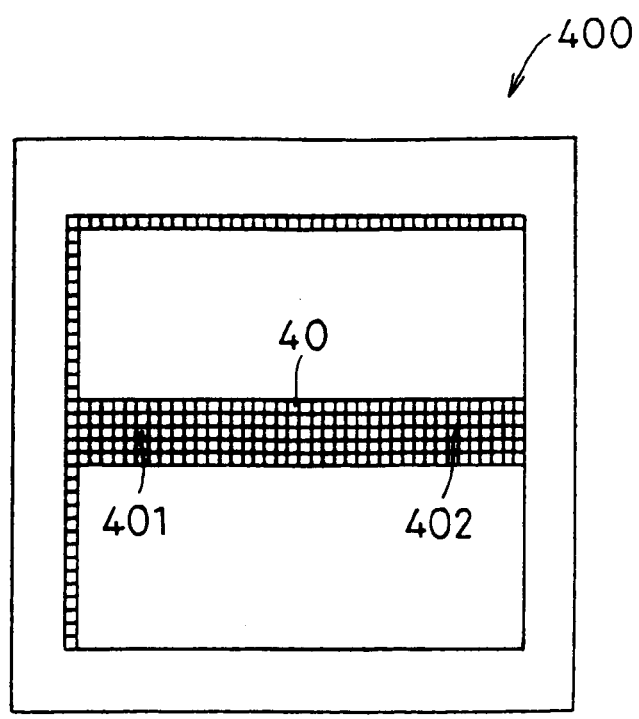
FIG. 6 is a plan view showing a second photomask cluster.

The identification mark 44, which is for example indicated by a letter such as a numeric character, is used to identify models of hologram elements produced with use of the second photomask 40. The first test pattern 45 is composed of straight-line segments arranged side by side at an interval equal to a median value of the grating interval of the hologram. When a defective hologram component is produced, the first test pattern 45 is used to analyze the cause. The second test pattern 46, which is composed of straight-line segments arranged side by side at an interval equal to a median value of the grating interval of the hologram, is used for examinations conducted in the production of the photomask. When a hologram element in finished form is secured to a package, the image processing mark 47 is used to adjust the orientation of the hologram element. Moreover, an assembly body of hologram elements, which is produced with use of a cluster of photomasks as shown in FIG. 6 (described later), is subjected to dicing to obtain separate hologram elements. At this time, the dicing operation is performed with reference to the dicing mark 48.

FIG. 6 is a plan view showing a second photomask cluster 400. The second photomask cluster 400 is composed of a plurality of second photomasks 40. The second photomask cluster 400 further includes a first alignment pattern 401 and a second alignment pattern 402. The first and second alignment patterns 401 and 402 are used to perform alignment at the time of light exposure.

Listed in Table 1 are the grating interval, the groove opening width, and the duty ratio as observed in each of the hologram regions of the a-model hologram element produced with use of the first photomask 30, as well as the b-model hologram element produced with use of the second photomask 40.

TABLE 1

| Model | Divisional number | Region | Grating interval | Groove opening width | Duty ratio |
|---|---|---|---|---|---|
| a | 2 | First region | 1.608 μm | 0.804 μm | 0.5 |
|   |   | Second region | 1.276 μm | 0.508 μm | 0.4 |
| b | 3 | First region | 2.274 μm | 1.137 μm | 0.5 |
|   |   | Second region | 1.676 μm | 0.754 μm | 0.45 |
|   |   | Third region | 1.676 μm | 0.754 μm | 0.45 |

Figure 7A:
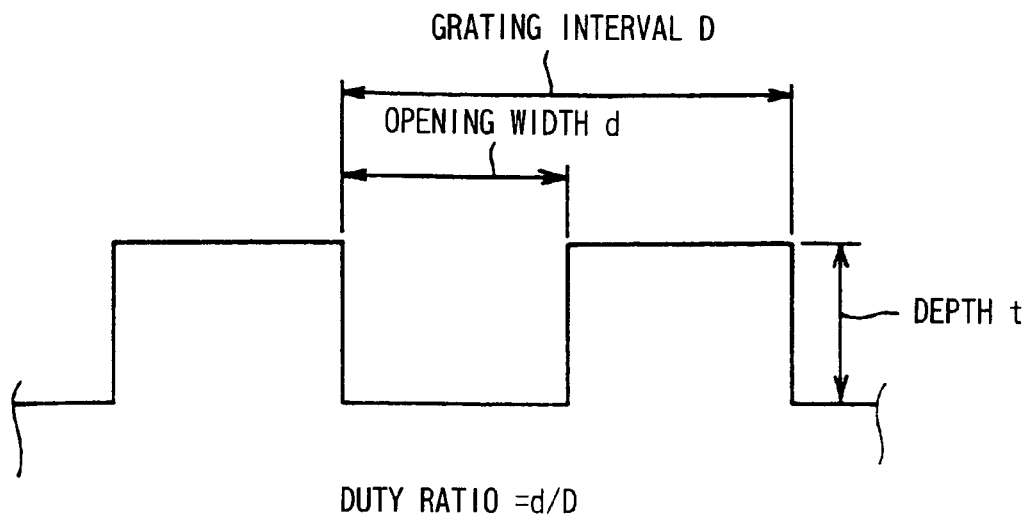
FIG. 7A is a sectional view of a diffraction grating with a groove having a rectangular sectional profile, illustrating a grating interval D and an opening width d as viewed in the direction in which the grooves are aligned.
Figure 7B:
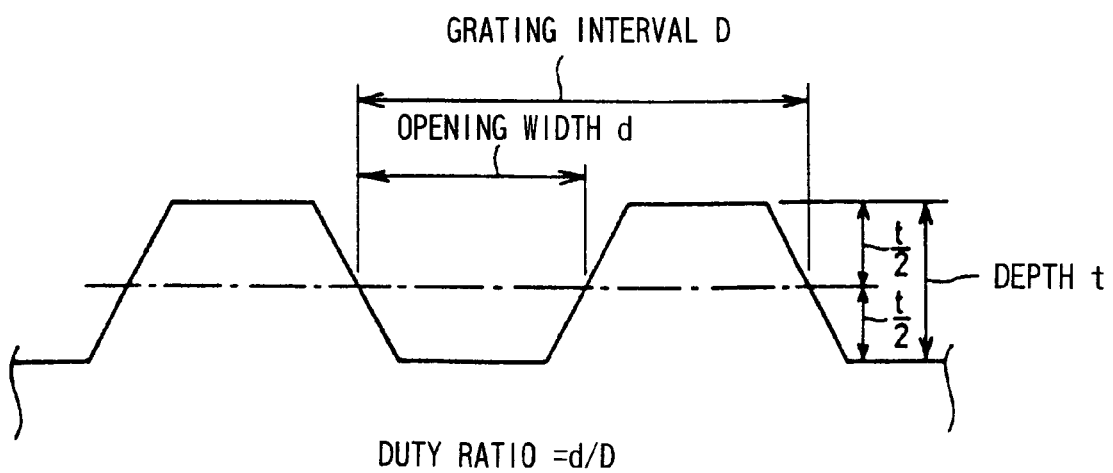
FIG. 7B is a sectional view of a diffraction grating with a groove having tapered side walls, i.e. having a trapezoid sectional profile, illustrating a grating interval D and an opening width d as viewed in the direction in which the grooves are aligned.

FIG. 7A is a sectional view of a diffraction grating with a groove having a rectangular sectional profile, illustrating a grating interval D and an alignment-direction-wise groove opening width d. FIG. 7B is a sectional view of a diffraction grating with a groove having tapered side walls, i.e., having a trapezoid sectional profile, illustrating a grating interval D and an alignment-direction-wise groove opening width d. The duty ratio is defined as d/D: the ratio of the alignment-direction-wise groove opening width d to the grating interval D in the diffraction grating. In the diffraction grating with a groove having a trapezoid sectional profile as shown in FIG. 7B, the alignment-direction-wise groove opening width d is defined as an opening width as observed at half of the height of the groove depth t.

Figure 8:
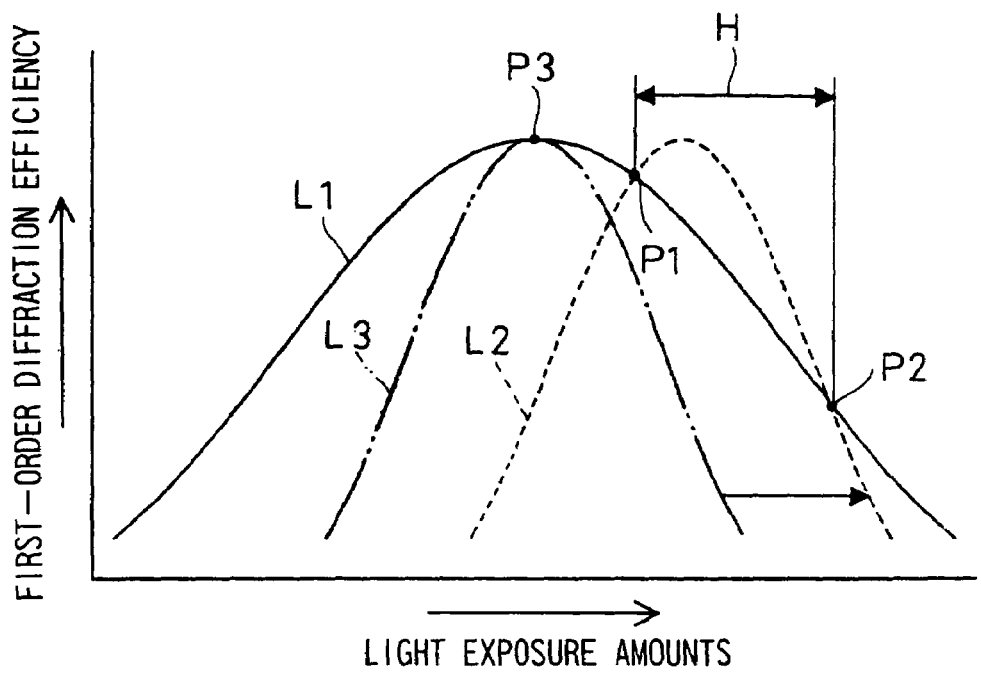
FIG. 8 is a graph showing the relationship between light exposure amounts in the production of a hologram element and the first-order diffraction efficiency as observed in each hologram region.

FIG. 8 is a graph showing the relationship between light exposure amounts in the production of a hologram element and the first-order diffraction efficiency of each hologram region. FIG. 8 is particularly pertinent to the a-model hologram element produced with use of for example the first photomask 30 shown in FIG. 2, in accordance with the photolithography method (refer to Table 1). In FIG. 8, the solid line L1 represents the relationship between light exposure amounts in the formation of the diffraction grating (grating interval=1.608 μm; and duty ratio=0.5) of the first region of the hologram, and the first-order diffraction efficiency of the first region; and the broken line L2 represents the relationship between light exposure amounts in the formation of the diffraction grating (grating interval=1.276 μm; and duty ratio=0.4) of the second region of the hologram, and the first-order diffraction efficiency of the second region. Moreover, in FIG. 8, the long dashed double-dotted line L3 represents the relationship between light exposure amounts in the formation of a diffraction grating having a grating interval of 1.276 μm (equal to the grating interval in the second region) and a duty ratio of 0.5 (equal to the duty ratio in the first region), and the first-order diffraction efficiency of the diffraction grating. As seen from FIG. 8, the graph, which shows the relationship between light exposure amounts in the production of the diffraction grating of each hologram region and the first-order diffraction efficiency, commonly takes on a convex form wherein the first-order diffraction efficiency is at the maximum when the light exposure amount reaches a certain level. As seen from the solid line L1 and the broken line L2, the greater the grating interval, the gentler the curve of the graph can be with respect to the vertex indicating a certain exposure amount corresponding to the maximum first-order diffraction efficiency.

Even if, in the hologram element, the respective hologram regions have different diffraction grating intervals, as long as the diffraction gratings of the regions have equal duty ratio, as indicated by the lines L1 and L3 shown in FIG. 8, the exposure-amount value at which the regions are equal in first-order diffraction efficiency generally signifies the exposure-amount value at which the regions each have the maximum first-order diffraction efficiency. At this time, the regions are also equal in maximum value for the first-order diffraction efficiency. Thus, in the a-model hologram element, its hologram is so configured that the first region has a duty ratio of 0.5 whereas the second region has a duty ratio of 0.4. In this way, by designing the hologram element such that the diffraction gratings of the hologram regions have different duty ratios, the hologram regions can be made different from each other in certain exposure-amount value corresponding to the maximum first-order diffraction efficiency. In detail, as shown in the broken line L2 (duty ratio: 0.4) and the long dashed double-dotted line L3 (duty ratio: 0.5) shown in FIG. 8, the graph is shifted in such a way that, the smaller the duty ratio of the diffraction grating in the hologram, the larger the exposure-amount value corresponding to the maximum first-order diffraction efficiency.

In the production of the hologram element, by adjusting the duty ratio of the diffraction grating having a shorter grating interval to be smaller than that of the diffraction grating having a longer grating interval, it is possible to obtain an exposure-amount range in which the first-order diffraction efficiency of the region having a diffraction grating with a shorter grating interval is higher than that of the region having a diffraction grating with a longer grating interval (refer to the section H shown in FIG. 8). Thereby, the first-order diffraction efficiency ratio between the regions can be set at a desired value.

Another advantage can be gained by adjusting the duty ratio of the diffraction grating having a shorter grating interval to be smaller than that of the diffraction grating having a longer grating interval. As shown in FIG. 8, as compared with the intersection point P3 of the two graphs indicated by the solid line L1 and the long dashed double-dotted line L3, respectively, which is obtained when the diffraction gratings have equal duty ratio, the intersection point P1, P2 of the two graphs: the graph concerning the region having a diffraction grating with a longer grating interval and the graph concerning the region having a diffraction grating with a shorter grating interval, can be located at graph positions where larger exposure-amount values are observed. This makes it possible to assign a desired value to the certain exposure amount with which the graph concerning the region having a diffraction grating with a longer grating interval and the graph concerning the region having a diffraction grating with a shorter grating interval intersect each other, that is, the first-order diffraction efficiency ratio between the regions is given as 1.0. Thereby, during the photolithography-based exposure process, the photoresist can be prevented from undergoing insufficient light exposure caused by the exposure amount being smaller than the desired value. In addition, a hologram element exhibiting desired optical characteristics can be realized without fail.

Figure 9:
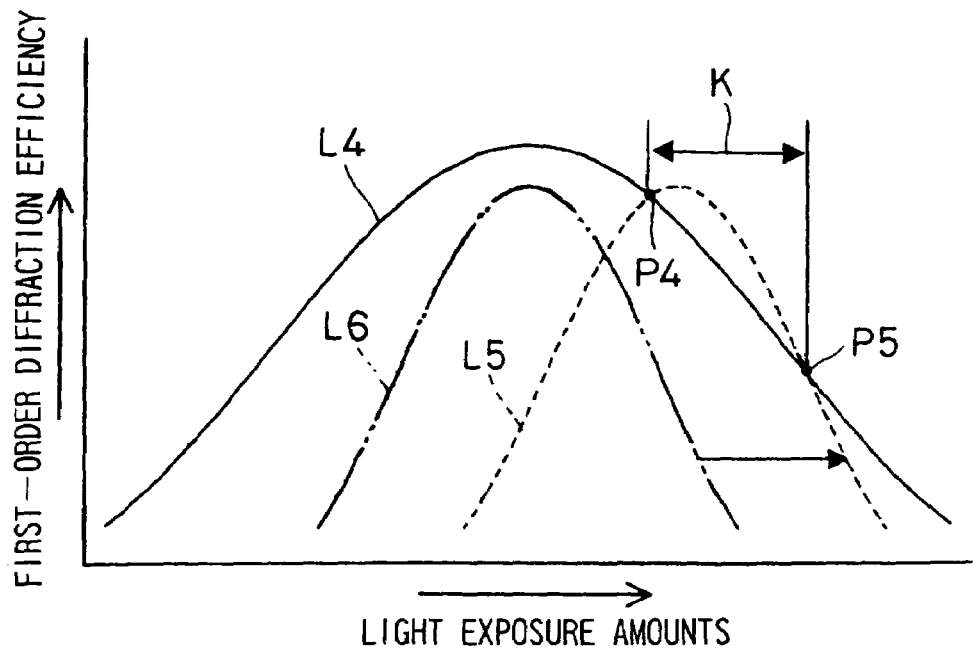
FIG. 9 is a graph showing the relationship between light exposure amounts in the production of a hologram element coated with a reflection preventive film and the first-order diffraction efficiency as observed in each hologram region.

FIG. 9 is a graph showing the relationship between light exposure amounts in the production of a hologram element coated with a reflection preventive film and the first-order diffraction efficiency of each hologram region. The hologram element pertinent to FIG. 9 is constructed by applying a reflection preventive film to the a-model hologram element described previously. In FIG. 9, the solid line L4 represents the relationship between light exposure amounts in the formation of the diffraction grating of the first region of the hologram coated with a reflection preventive film, and the first-order diffraction efficiency of the first region; and the broken line L5 represents the relationship between light exposure amounts in the formation of the diffraction grating of the second region of the hologram coated with a reflection preventive film, and the first-order diffraction efficiency of the second region. Moreover, in FIG. 9, the long dashed double-dotted line L6 represents the relationship between light exposure amounts in the formation of a reflection preventive film-coated diffraction grating having a grating interval equal to the grating interval in the second region and a duty ratio equal to the duty ratio in the first region, and the first-order diffraction efficiency of the diffraction grating.

In a case where a reflection preventive film is applied to the hologram element, in general, the degree of decrease in the first-order diffraction efficiency is higher in the hologram region having a shorter grating interval than in the hologram region having a longer grating interval (refer to the solid line L4 and the long dashed double-dotted line L6 shown in FIG. 9). Thus, it is difficult to make the regions equal in first-order diffraction efficiency, in other words, it is difficult to set the first-order diffraction efficiency ratio between the regions at 1.0. With this in view, the hologram element is designed in advance such that the first-order diffraction efficiency of the region having a diffraction grating with a shorter grating interval is made greater than that of the region having a diffraction grating with a longer grating interval (refer to the section K shown in FIG. 9). By so doing, even if a reflection preventive film is applied to the hologram element, the regions can be made equal in first-order diffraction efficiency (refer to the intersection points P4 and P5), in other words, the first-order diffraction efficiency ratio between the regions can be set at 1.0: the optimum value. As a result, a hologram element exhibiting optimum optical characteristics can be produced without fail. Note that, in the diffraction grating having a longer grating interval, the duty ratio may alternatively be set at a value larger than 0.5, for example, 0.6.

Figure 10:
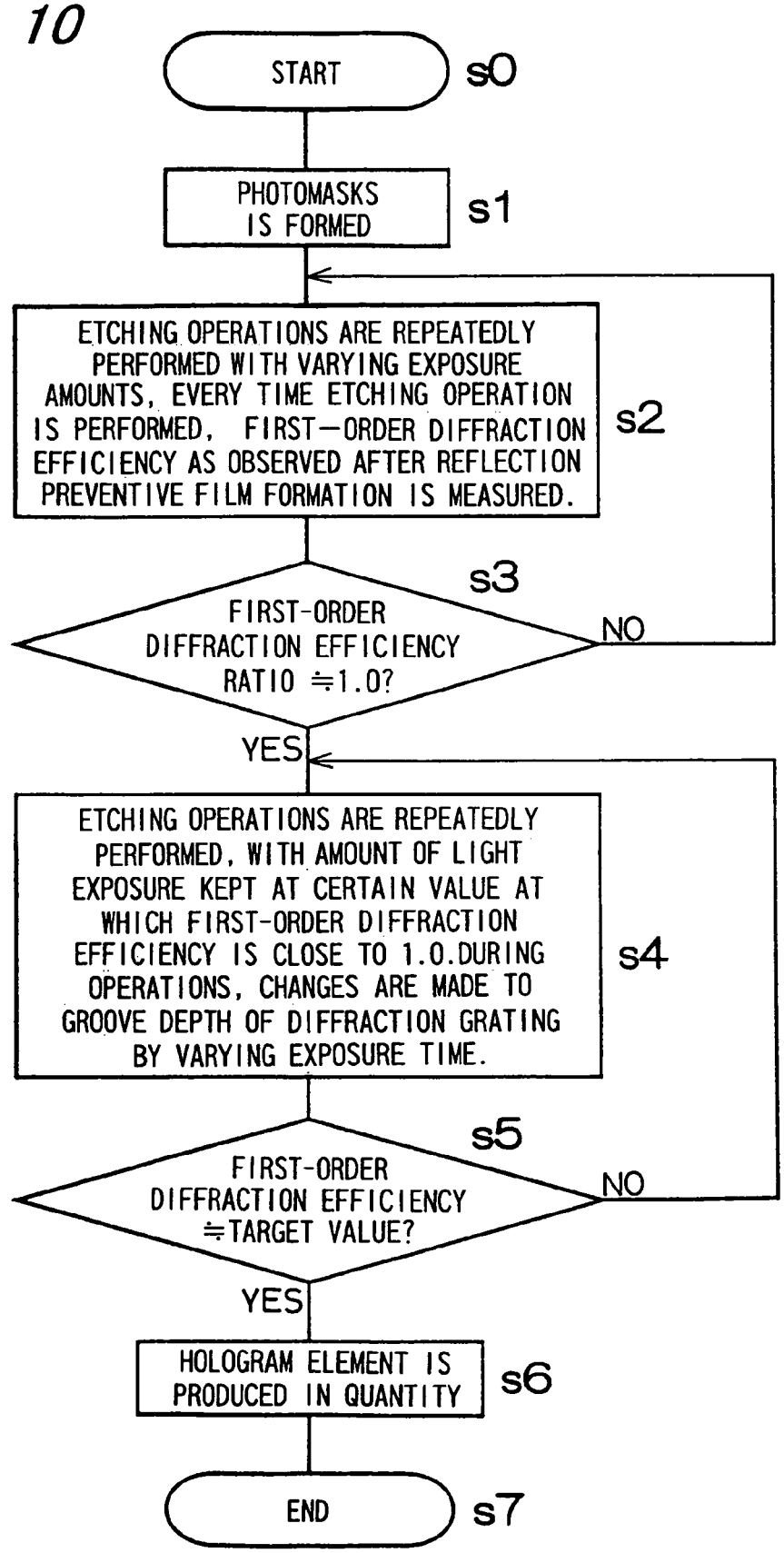
FIG. 10 is a flow chart showing the procedure for a hologram element producing method according to another embodiment of the invention.

FIG. 10 is a flow chart showing the procedure for a hologram element producing method according to another embodiment of the invention. Upon starting of the procedure for producing a hologram element at Step s0, the procedure proceeds to Step s1. At Step s1, a photomask analogous to the above-described first and second photomasks 30 and 40 is formed. Then, the procedure proceeds to Step s2.

At Step s2, etching operations are repeatedly performed with varying exposure amounts, using the photomask fabricated at Step s1. Every time the etching operation is performed, the first-order diffraction efficiency as observed after the reflection preventive film formation is measured. Then, the procedure proceeds to Step s3. At Step s3, whether the first-order diffraction efficiency ratio between the hologram regions of the hologram element is given as a value close to 1.0 or not is checked. The first-order diffraction efficiency ratio taking on a value close to 1.0 means that the value for the first-order diffraction efficiency ratio falls within 5% error with respect to 1.0. At Step s3, if it is judged that the first-order diffraction efficiency ratio is not close to 1.0, the procedure returns to Step s2. By contrast, if it is judged that the first-order diffraction efficiency ratio is close to 1.0, the procedure proceeds to Step s4.

At Step s4, etching operations are repeatedly performed, with the amount of light exposure kept at a certain value at which the first-order diffraction efficiency is close to 1.0. During the operations, changes are made to the groove depth of the diffraction grating by varying the exposure time. Every time the etching operation is performed, the first-order diffraction efficiency as observed after the reflection preventive film formation is measured. Then, the procedure proceeds to Step s5. At Step s5, whether the first-order diffraction efficiency of each hologram region of the hologram element is close to the target value or not is checked. The first-order diffraction efficiency taking on a value close to the target value means that the value for the first-order diffraction efficiency falls within 5% error with respect to the target value. At Step s5, if it is judged that the first-order diffraction efficiency is not close to the target value, the procedure returns to Step s4. By contrast, if it is judged that the first-order diffraction efficiency is close to the target value, the procedure proceeds to Step s6 where the hologram element is produced in quantity. Then, the procedure proceeds to Step s7, thereupon the procedure for producing the hologram element comes to an end.

In this way, after obtaining a certain exposure-amount value at which the hologram regions having the diffraction grating are made equal in first-order diffraction efficiency (Steps s2 and s3 shown in FIG. 10), changes are made to the groove depth of the diffraction grating (Steps s4 and s5 shown in FIG. 10) to produce hologram elements (Step s7). Note that the amount of light exposure in the formation of the diffraction grating of each hologram region has a direct influence on the first-order diffraction efficiency of each region, as well as the first-order diffraction efficiency ratio between the regions. Meanwhile, the groove depth of the diffraction grating has no direct influence on the duty ratio of the diffraction grating of each region, and only the diffraction efficiency is varied. Thus, it is preferable that changes are made to the groove depth of the diffraction grating after obtaining a certain exposure-amount value at which the hologram regions are equal in first-order diffraction efficiency. This makes it possible to produce without fail a hologram element exhibiting desired optical characteristics.

Figure 11:
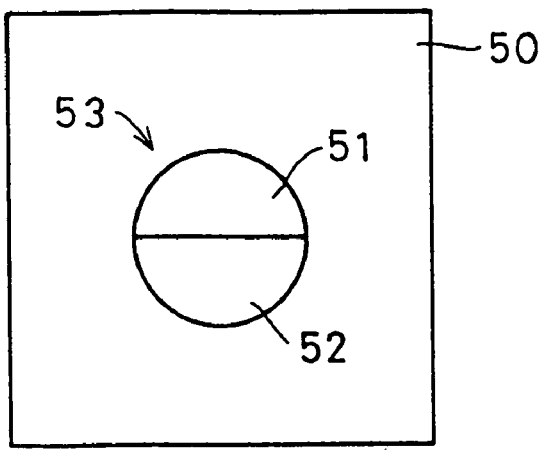
FIG. 11 is a plan view showing a first hologram element according to another embodiment of the invention.
Figure 12:
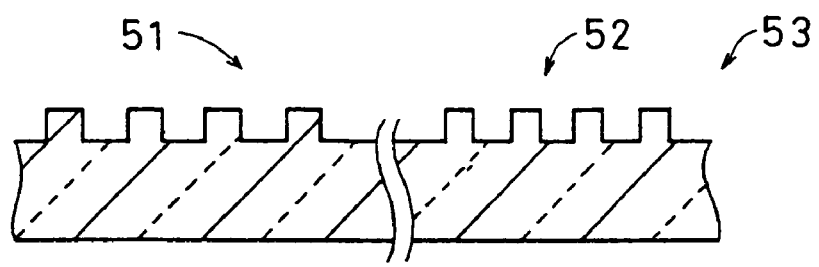
FIG. 12 is a sectional view of a hologram, illustrating a first region and a second region.

FIG. 11 is a plan view showing a first hologram element 50 according to another embodiment of the invention. FIG. 12 is a sectional view of a hologram 53, illustrating a first region 51 and a second region 52. The hologram 53 shown in FIG. 12 has a diffraction grating analogous to the diffraction grating shown in FIGS. 7A and 7B. The first hologram element 50 is produced in accordance with the hologram-element producing method thus far described. The first hologram element 50 has the first-model hologram 53 which is divided into a plurality of regions, in this embodiment, two regions: the first and second regions 51 and 52, in each of which a diffraction grating is formed. The diffraction gratings of the first and second regions 51 and 52 differ from each other in grating interval and duty ratio. The first hologram element 50 and the hologram 53 are each made of for example a quartz glass material. Note that the first hologram element 50 and the hologram 53 may alternatively be made of any other like material so long as it is transparent and hard for laser-light radiation. The preferred examples thereof include: soda lime glass; low-alkali glass; and acrylic resin.

According to the first hologram element 50 of the embodiment, the first hologram element 50 has the hologram 53 which is divided into the first and second regions 51 and 52, in each of which a diffraction grating is formed. The diffraction gratings of the first and second regions 51 and 52 differ from each other in grating interval and duty ratio. Specifically, the grating interval of the first region 51 is made shorter than that of the second region 52, and the duty ratio of the second region 52 is set at 0.5, whereas the duty ratio of the first region 51 is set to be smaller than 0.5. In the hologram 53 of the first hologram element 50 thus designed, since the diffraction gratings of the first and second regions 51 and 52 have different grating intervals, the first and second regions 51 and 52 differ from each other in light exposure amount-and-first order diffraction efficiency relationship in the formation of the diffraction grating of each region.

Even if, in the hologram 53, the diffraction gratings of the regions 51 and 52 have different grating intervals, as long as the diffraction gratings of the regions 51 and 52 are equal in duty ratio, the exposure-amount value at which the regions have equal first-order diffraction efficiency signifies the exposure-amount value at which the regions each have the maximum first-order diffraction efficiency. At this time, the regions are also equal in maximum value for the first-order diffraction efficiency. Thus, in the hologram element, by designing the hologram such that the diffraction gratings of the regions have different duty ratios, the regions 51 and 52 of the hologram 53 differ from each other in exposure-amount value corresponding to the maximum first-order diffraction efficiency. This makes it possible to set the first-order diffraction efficiency ratio between the regions 51 and 52 of the hologram 53 at a desired value, and thereby impart desired optical characteristics to the first hologram element 50. Note that, in this embodiment, the duty ratio of the diffraction grating of the region having a shorter grating interval is set to be smaller than 0.5. It is needless to say, however, that the duty ratio of the diffraction grating of the region having a longer grating interval may be set to be larger than 0.5.

Figure 13:
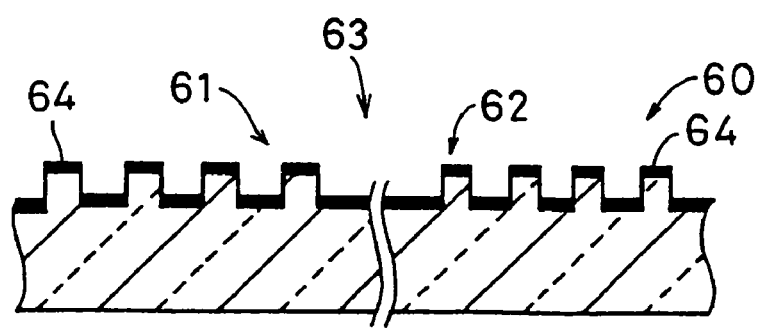
FIG. 13 is a sectional view of a second hologram element according to still another embodiment of the invention, illustrating a first region and a second region of a hologram.

FIG. 13 is a sectional view of a second hologram element 60 according to still another embodiment of the invention, illustrating a first region 61 and a second region 62 of a hologram 63. The second hologram element 60 is produced in accordance with the hologram-element producing method thus far described. The second hologram element 60 has the hologram 63 which is divided into a plurality of regions, in this embodiment, two regions: the first and second regions 61 and 62, in each of which a diffraction grating is formed. The hologram 63 is coated with a reflection preventive film 64. The diffraction gratings of the first and second regions 61 and 62 differ from each other in grating interval and duty ratio. Moreover, in the second hologram element 60, the first and second regions 61 and 62 are equal in first-order diffraction efficiency.

The second hologram element 60 and the hologram 63 are each made of any of quartz glass, soda lime glass, and low-alkali glass. The reflection preventive film 64 takes on any of a single-layer structure made of magnesium fluoride (chemical formula: $MgF_2$); a double-layer structure made of silicon monoxide (chemical formula: $SiO$) and silicon dioxide (chemical formula: $SiO_2$); and a triple-layer structure made of magnesium fluoride (chemical formula: $MgF_2$), zirconium oxide (chemical formula: $ZrO_2$), and aluminum oxide (chemical formula: $Al_2O_3$).

According to the second hologram element 60 of the embodiment, the second hologram element 60 has the hologram 63 which is divided into the first and second regions 61 and 62, in each of which a diffraction grating is formed. The diffraction gratings of the first and second regions 61 and 62 have different grating intervals. In the hologram 63, the first and second regions 61 and 62 are each coated with the reflection preventive film 64. In this state, the first and second regions 61 and 62 are equal in first-order diffraction efficiency. In the hologram 63 of the second hologram element 60 thus designed, since the diffraction gratings of the first and second regions 61 and 62 have different grating intervals, a difference is caused between the first and second regions 61 and 62 in relationship between light exposure amounts in the formation of the diffraction gratings of the regions 61 and 62 and the first-order diffraction efficiency. Further, since the first and second regions 61 and 62 are equal in first-order diffraction efficiency in the state of being coated with the reflection preventive film 64, the first-order diffraction efficiency ratio between the regions 61 and 62 of the hologram 63 is given as 1.0. Thus, the second hologram element 60 succeeds in providing optimum optical characteristics even in the state in which the regions 61 and 62 of the hologram 63 are coated with the reflection preventive film 64.

Note that some modifications may be made to the first hologram element 50 shown in FIGS. 11 and 12. For example, the hologram 53 may be so constructed that the diffraction gratings of the first and second regions 51 and 52 have different grating intervals, and that the duty ratio of the diffraction grating having the maximum grating interval is set to be smaller than 0.5; wherefore a third hologram element can be obtained. Alternatively, the hologram 53 may be so constructed that the diffraction gratings of the first and second regions 51 and 52 have different grating intervals, and that the duty ratio of the diffraction grating having the minimum grating interval is set to be larger than 0.5.

According to the hologram elements thus far described, a desired value can be assigned to the certain exposure amount with which the hologram regions are equal in first-order diffraction efficiency. In this way, since a desired value can be assigned to the certain exposure amount with which the hologram regions are equal in first-order diffraction efficiency, in other words, the first-order diffraction efficiency ratio between the regions is given as 1.0, the above-described hologram elements succeed in providing desired optical characteristics.

Figure 14:
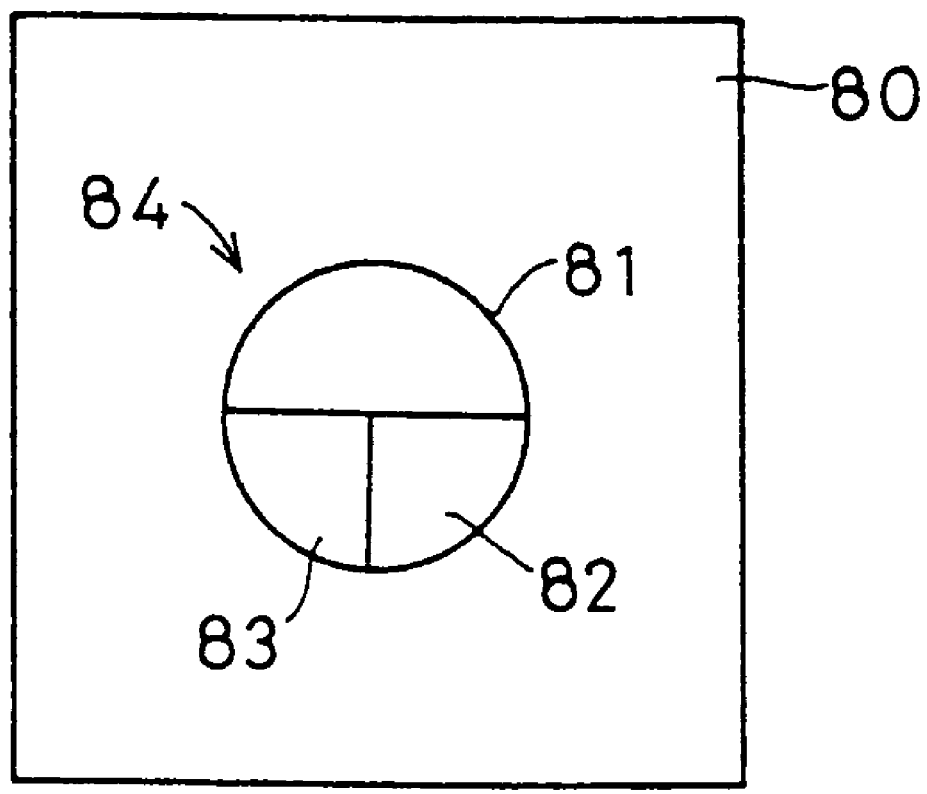
FIG. 14 is a plan view showing a fourth hologram element according to still another embodiment of the invention.
Figure 15:
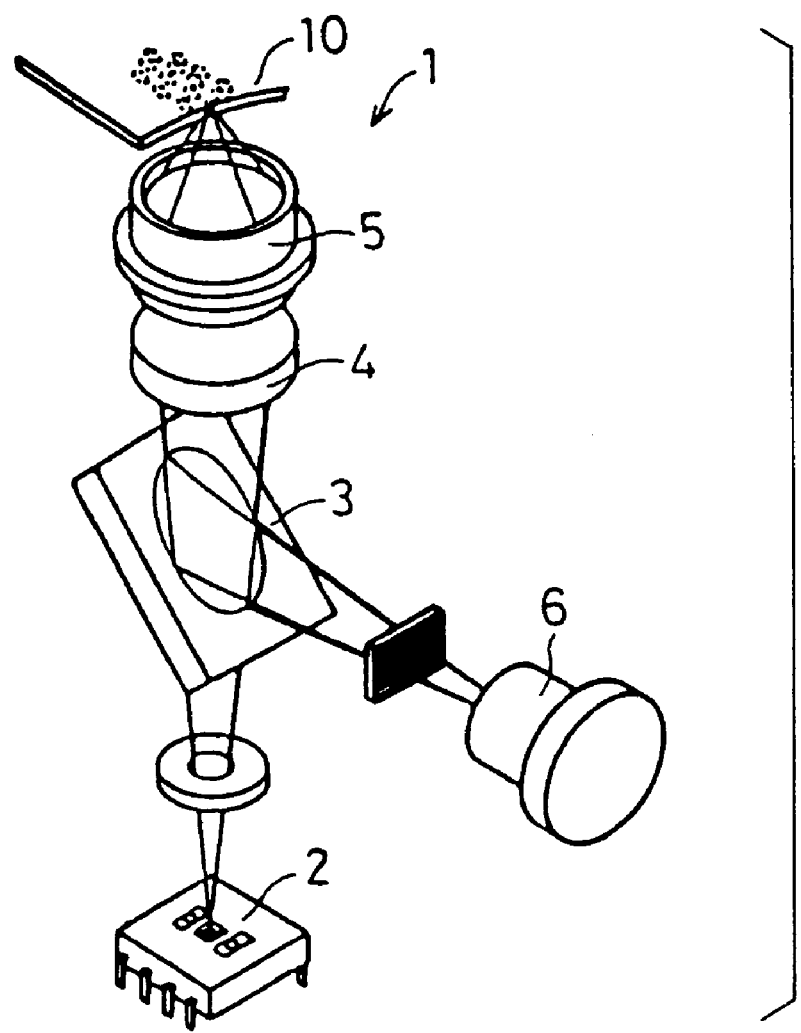
FIG. 15 is a perspective view showing an optical pickup apparatus according to one conventional art.
Figure 16:
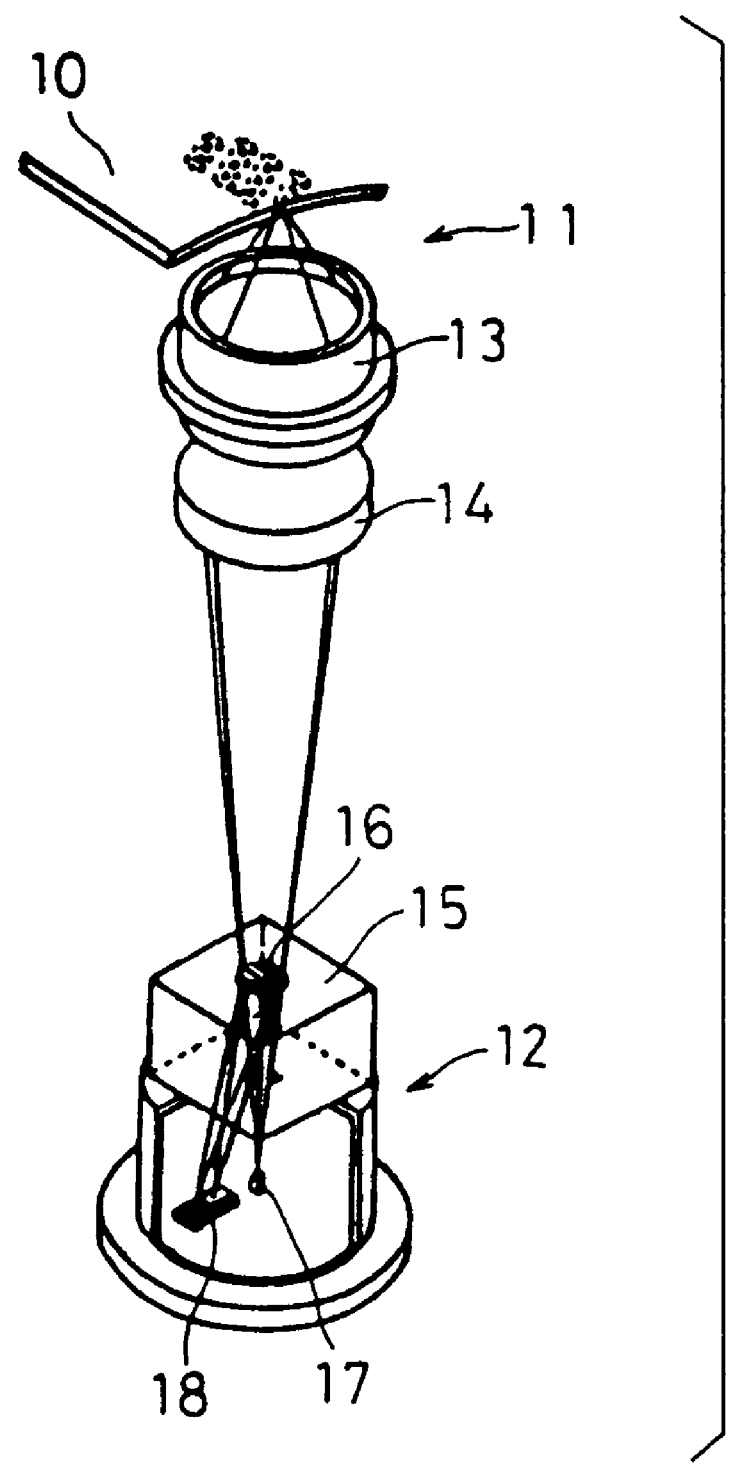
FIG. 16 is a perspective view showing an optical pickup apparatus employing an integrated unit optical system according to another conventional art.
Figure 18:
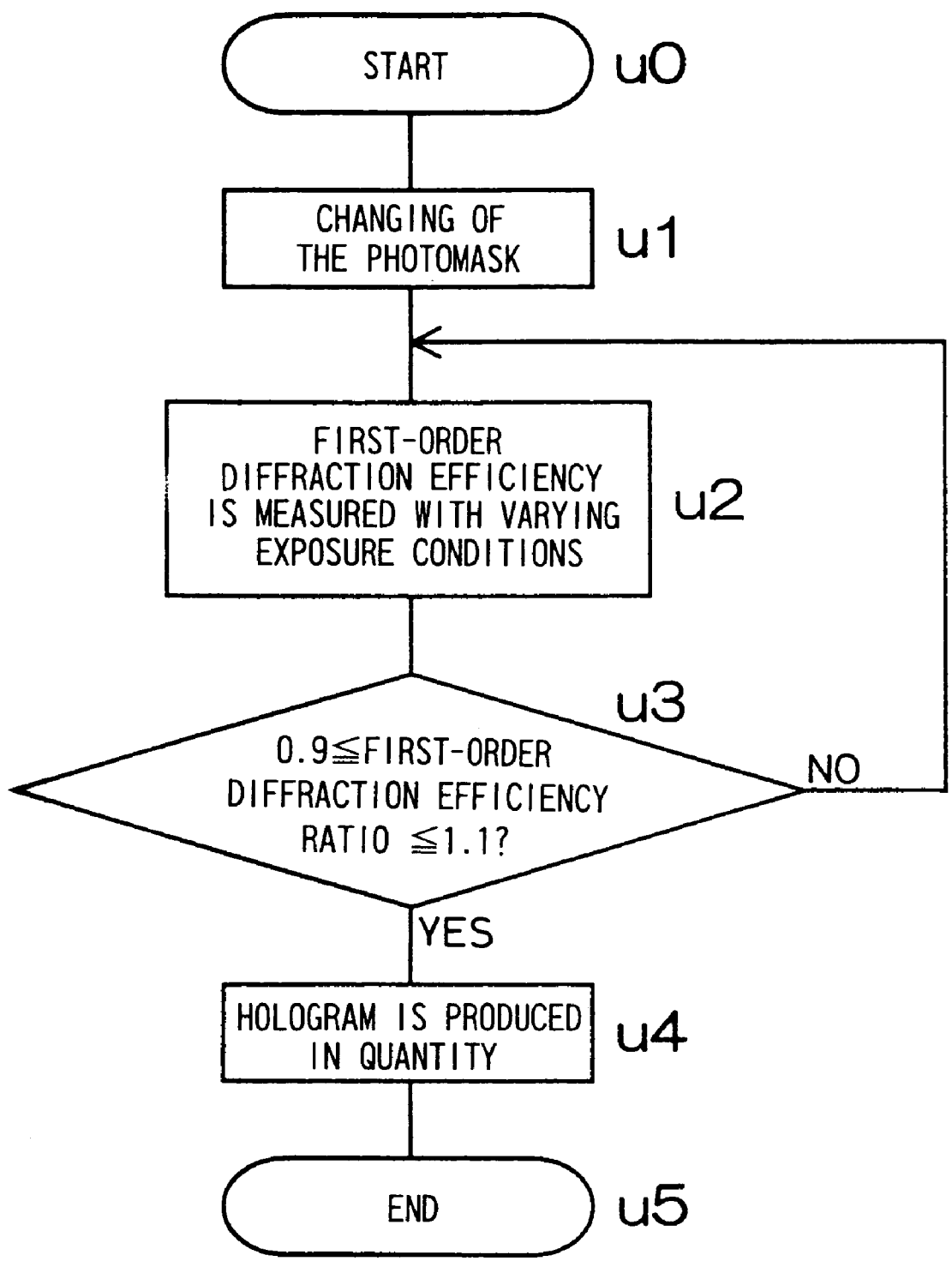
FIG. 18 is a flow chart showing the procedure for controlling a diffraction efficiency ratio in the production of the hologram in accordance with the photolithography method.
Figure 19A:
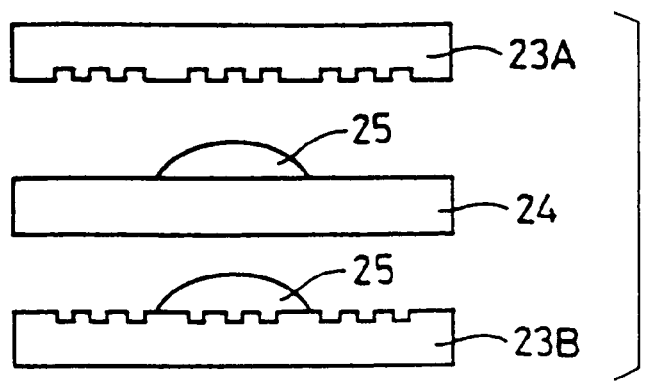
FIGS. 19A to 19C are sectional views showing the process steps for producing the hologram in accordance with a photopolymer method.
Figure 19B:
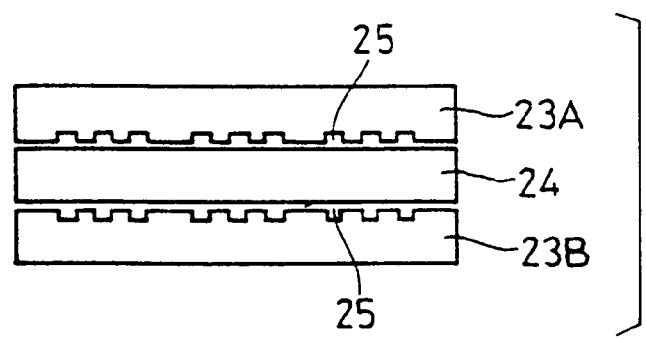
Figure 19C:
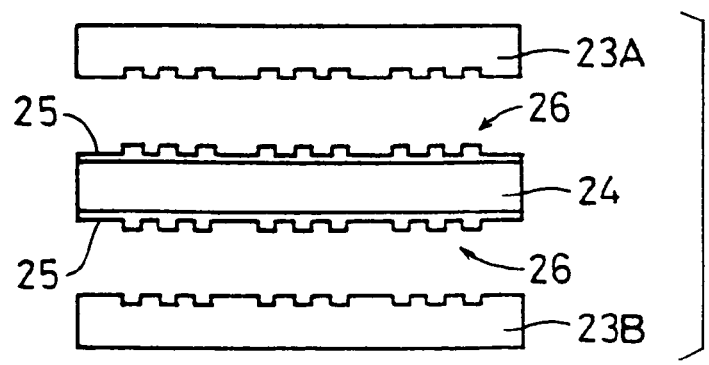
Figure 20:
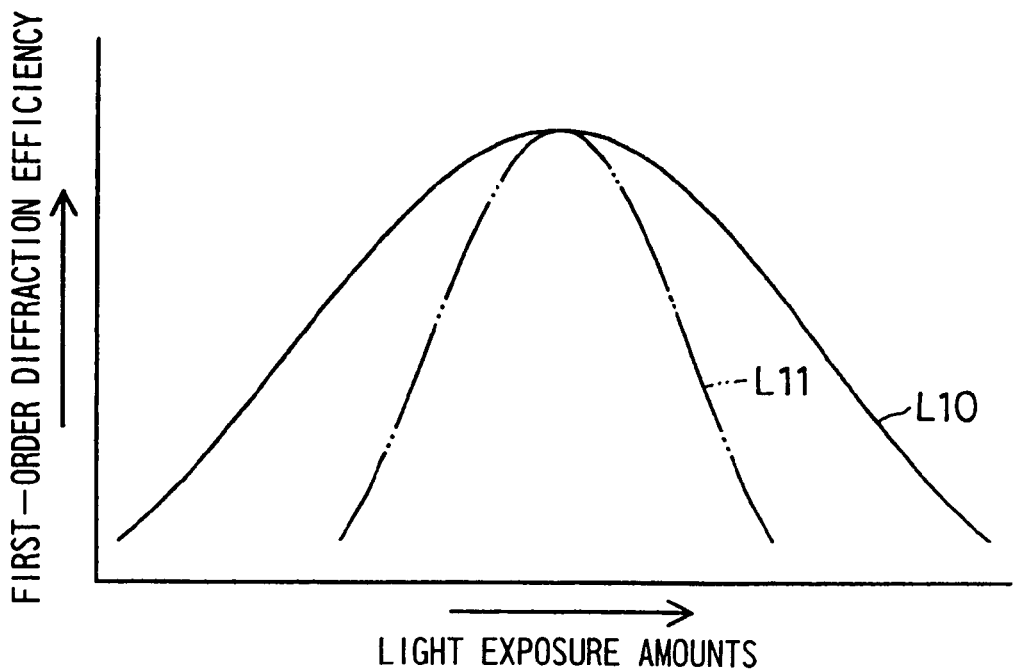
FIG. 20 is a graph showing the relationship between the first-order diffraction efficiency and light exposure amounts as observed in each of the two regions having different diffraction grating intervals.
Figure 21:
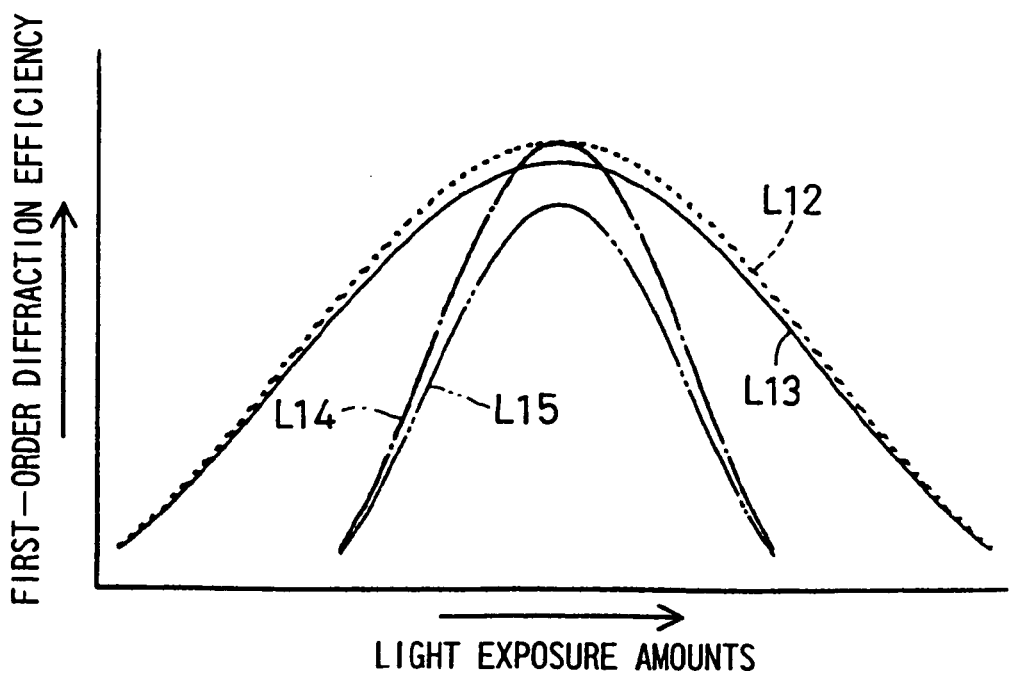
FIG. 21 is a graph showing the relationship between the first-order diffraction efficiency and light exposure amounts found before and after a reflection preventive film is vapor-deposited, as observed in each of the two regions having different diffraction grating intervals.

FIG. 14 is a plan view showing a fourth hologram element 80 according to still another embodiment of the invention. The fourth hologram element 80 is produced in accordance with the hologram-element producing method thus far described. The fourth hologram element 80 has a third-model hologram 84 which is divided into a plurality of regions, in this embodiment, three regions: a first, a second, and a third region 81, 82, and 83, in each of which a diffraction grating is formed. The diffraction gratings of the first and second regions 81 and 82 have different grating intervals, but the first and second regions 81 and 82 are equal in first-order diffraction efficiency. On the other hand, the diffraction gratings of the first and third regions 81 and 83 have different grating intervals, but the first and third regions 81 and 83 are equal in first-order diffraction efficiency. The fourth hologram element 80 and the hologram 83 are each made of for example a quartz glass material. Note that the fourth hologram element 80 and the hologram 83 may alternatively be made of any other like material so long as it is transparent and hard for laser-light radiation. The preferred examples thereof include: soda lime glass; low-alkali glass; and acrylic resin.

According to the fourth hologram element 80 of the embodiment, the fourth hologram element 80 has the hologram 84 which is divided into the first, second, and third regions 81, 82, and 83, in each of which a diffraction grating is formed. Of the first to third regions 81, 82, and 83, at least two regions differ from each other in diffraction grating interval, but are equal in first-order diffraction efficiency. In the hologram 84 of the fourth hologram element 80 thus designed, of the first to third regions 81 to 83, at least two regions have different diffraction grating intervals. Hence, a difference is caused between the regions in relationship between exposure amounts in the formation of the diffraction gratings of the regions 81 to 83 and the first-order diffraction efficiency. Further, since the first to third regions 81 to 83 are equal in first-order diffraction efficiency, the first-order diffraction efficiency ratio as observed in the hologram 84 is given as 1.0. Thus, the fourth hologram element 80 succeeds in providing optimum optical characteristics.

Listed in Table 2 are the ranges of the grating intervals as observed in the first-model hologram 53, the second-model hologram, and the third-model hologram 84 that correspond to the first hologram element 50, the third hologram element, and the fourth hologram element 80, respectively.

TABLE 2

| Model | Grating interval | | |
|---|---|---|---|
| | First region | Second region | Third region |
| Model 1 | 2.630~2.750 µm | 1.910~1.980 µm | |
| Model 2 | 1.893~2.030 µm | 1.453~1.655 µm | |
| Model 3 | 2.075~2.252 µm | 1.652~1.831 µm | 1.652~1.831 µm |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for producing a hologram-element, comprising:
performing light exposure by a photolithography method in which a photomask comprising:
a plurality of mask regions for forming diffraction gratings of respective regions of a hologram, the mask regions being composed of a non-light-transmitting mask portion and a light-transmitting portion,
wherein, of the plurality of mask regions, at least two mask regions are configured differently from each other in arrangement interval at which the light-transmitting portions are arranged in an alignment direction, and in ratio of an alignment-direction-wise width for the light-transmitting portions to the alignment-direction-wise arrangement interval for the light-transmitting portions, is used, with a light-exposure amount kept in a level where respective hologram regions having diffraction gratings are equal in first-order diffraction efficiency.

2. A method for producing a hologram-element, comprising:
performing light exposure by a photolithography method according to claim 1, wherein in said photomask, the ratio of the alignment-direction-wise width to the alignment-direction-wise arrangement interval for the light-transmitting portions in a mask region of a shorter light-transmitting-portion arrangement interval is made smaller than the ratio of the alignment-direction-wise width to the alignment-direction-wise arrangement interval for the light-transmitting portions in a mask region having a longer light-transmitting-portion arrangement interval.

3. A method for producing a hologram-element, comprising:
performing light exposure by a photolithography method according to claim 1, wherein, in each of the regions of the photomask, the ratio of the alignment-direction-wise width to the alignment-direction-wise arrangement interval for the light-transmitting portions is set at 0.5 or below.

4. A method for producing a hologram-element, comprising: performing light exposure by a photolithography method in which a photomask comprising:
a plurality of mask regions for forming diffraction gratings of respective regions of a hologram, the mask regions being composed of a non-light-transmitting mask portion and a light-transmitting portion,
wherein, of the plurality of mask regions, at least two mask regions are configured differently from each other in arrangement interval at which the light-transmitting portions are arranged in an alignment direction, and in ratio of an alignment-direction-wise width for the light-transmitting portions to the alignment-direction-wise arrangement interval for the light-transmitting portions, is used, with a light-exposure amount kept in a level where a hologram region having a diffraction grating with a shorter grating interval is made larger in first-order diffraction efficiency than a hologram region having a diffraction grating with a longer grating interval.

5. A method for producing a hologram-element, comprising:
performing light exposure by a photolithography method according to claim 4, wherein in said photomask, the ratio of the alignment-direction-wise width to the alignment-direction-wise arrangement interval for the light-transmitting portions in a mask region of a shorter light-transmitting-portion arrangement interval is made smaller than the ratio of the alignment-direction-wise width to the alignment-direction-wise arrangement interval for the light-transmitting portions in a mask region having a longer light-transmitting-portion arrangement interval.

6. A method for producing a hologram-element, comprising: performing light exposure by a photolithography method according to claim 4, wherein, in each of the regions of the photomask, the ratio of the alignment-direction-wise width to the alignment-direction-wise arrangement interval for the light-transmitting portions is set at 0.5 or below.

* * * * *